(12) United States Patent
Heires et al.

(10) Patent No.: US 7,444,307 B2
(45) Date of Patent: Oct. 28, 2008

(54) PROCESS FOR CALCULATING THE ECONOMIC VALUE CREATED BY A BUSINESS ACTIVITY

(75) Inventors: Neal T. Heires, West Chester, PA (US); Jared R. Guckenberger, Victoria, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 761 days.

(21) Appl. No.: 10/609,389

(22) Filed: Jun. 26, 2003

(65) Prior Publication Data

US 2004/0267599 A1 Dec. 30, 2004

(51) Int. Cl.
*G06F 17/00* (2006.01)

(52) U.S. Cl. .................................... 705/400

(58) Field of Classification Search ................. 705/400, 705/1, 7, 11, 30; 703/2; 700/28–36, 67, 700/95–108
See application file for complete search history.

(56) References Cited

U.S. PATENT DOCUMENTS

| 5,721,903 | A | 2/1998 | Anand et al. | |
|---|---|---|---|---|
| 2002/0099563 | A1* | 7/2002 | Adendorff et al. | 705/1 |
| 2002/0169658 | A1 | 11/2002 | Adler | |
| 2003/0018503 | A1* | 1/2003 | Shulman | 705/7 |
| 2003/0130883 | A1 | 7/2003 | Schroeder et al. | |
| 2003/0172013 | A1 | 9/2003 | Block et al. | |
| 2003/0200104 | A1 | 10/2003 | Heming et al. | |
| 2003/0208468 | A1 | 11/2003 | McNab et al. | |
| 2003/0236721 | A1* | 12/2003 | Plumer et al. | 705/30 |

FOREIGN PATENT DOCUMENTS

EP 1304643 A1 * 7/2002

OTHER PUBLICATIONS

Robert Rachlin and Allen Sweeny, Accounting and Financial Fundamentals for NonFinancial Executives, 1996, American Management Association, 2nd Edition, pp. 43, 109, 112, 115-117.*

David Young and Stephen O'Byrne, EVA and Value Based Management: A Practical Guide to Implementation, McGraw-Hill Professional, pp. 34-47.*

* cited by examiner

*Primary Examiner*—Igor N Borissov

(57) ABSTRACT

A business process that collects data for multiple business activities from diverse sources, and facilitates the calculation of economic value added for these specific business activities. The economic value added of a specific business activity may be calculated in a hierarchical manner, related to a product, to a customer, to a geographical region, to a market, to a market segment, or to a product application. The process requires only inexpensive desk-top computers and conventional office software connected to a common server system having a relational database.

22 Claims, 41 Drawing Sheets

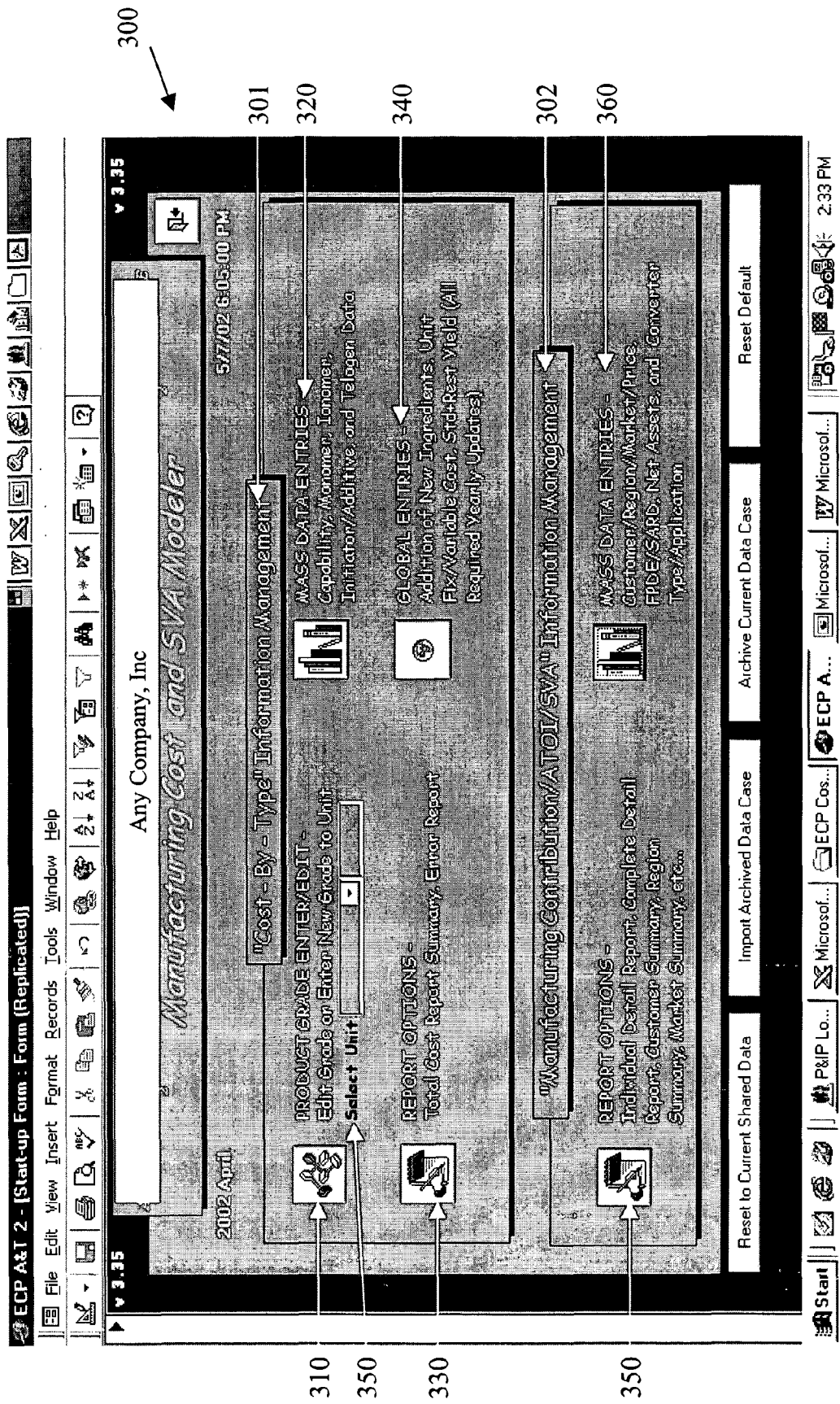
Figure 3 Main View

Entering Manufacturing Cost Data

Figure 5A

*Input Raw Material Costs for Each Ingredient on Each Unit*
102

550

| UNIT | MATERIAL NAME | MAT'L YIELD % | PRICE CONVERSION | FIXED COST ($/lb Ing) | VARIABLE COST ($/lb Ing) | COMMENTS |
|---|---|---|---|---|---|---|
| | X | 99 | 3.48 | 0 | .500 | 2/25/02-Updated |
| | A | 99 | 1 | 0 | .500 | Updated 6/27/01 |
| | B C | 99 | 1 | 0 | .500 | |
| | D E | 99 | 1 | 0 | .5000 | |
| | F | 99 | 1 | .5000 | | 1/29/01-Updated |
| | G | 99 | 1 | .5000 | | |
| | H J | 99 | 1 | .5000 | | 5/27/01 Updated |
| | K | 99 | 1 | .5000 | | |
| | | 99 | 1 | .500 | | 5/27/01 Updated |

Check an Internally Produced Ingredient

Figure 6A

Input Productivity,
Composition,
and Packaging
Data
For Each Grade
103

650

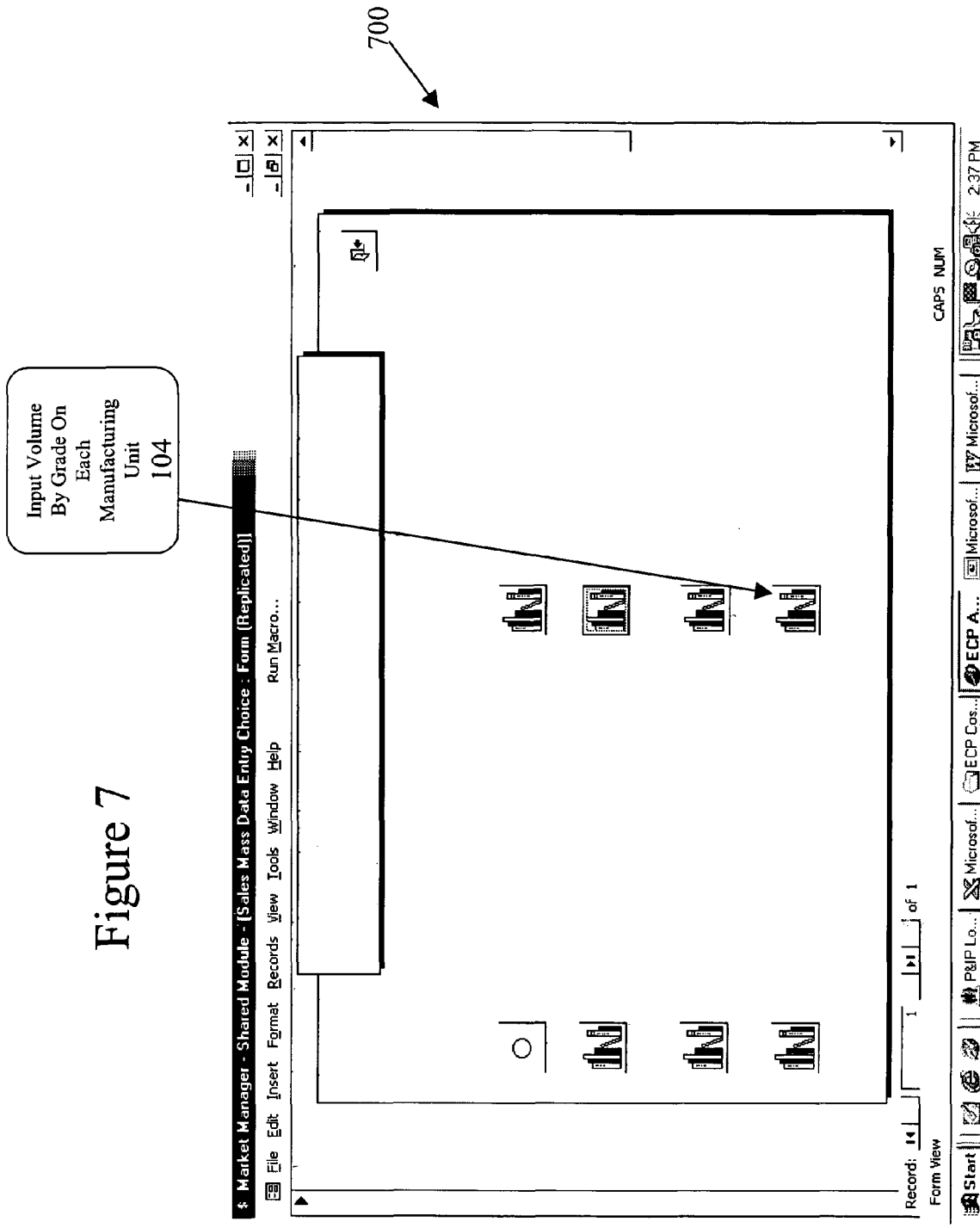

Figure 7A

Input Volume
By Grade On
Each
Manufacturing
Unit
104

750

This form contains the grade mix by unit to perform Actual COM calculations. The COM for a unit will be applied by the % of the total pounds that the unit contributed to the total grade production. All grades not included in the below listing will default to the Minimum Cost unit when "Actual Mix Cost" calculations are performed.

| UNIT | GRADE | VOLUME, LBS |
|------|-------|-------------|
| 1 | VAX460 | 100 |
| 2 | VAX460 | 100 |
| 3 | VAX460 | 200 |
| 4 | VAX460 | 400 |

Figure 8
Define Each Sale by Market/Segment in Spreadsheet

Input Sales Data By Customer, Region, Grade
111

Input Market & Segment By Customer, Region, Grade
112

Pull Sales Data from Main Frame Data by Region-ProdCode-Customer-Quantity-Price Then Use VLOOKUP formula to Assign Sales to Customer-Prod Cd-Region to Market-Segment Per Master Lookup Table where Sales has pre-identified all customers by market-segment

Figure 9A

Input Sales Data
By Customer,
Region, Grade
111

950

Market & Segment Identified for Each Customer, Region, Grade

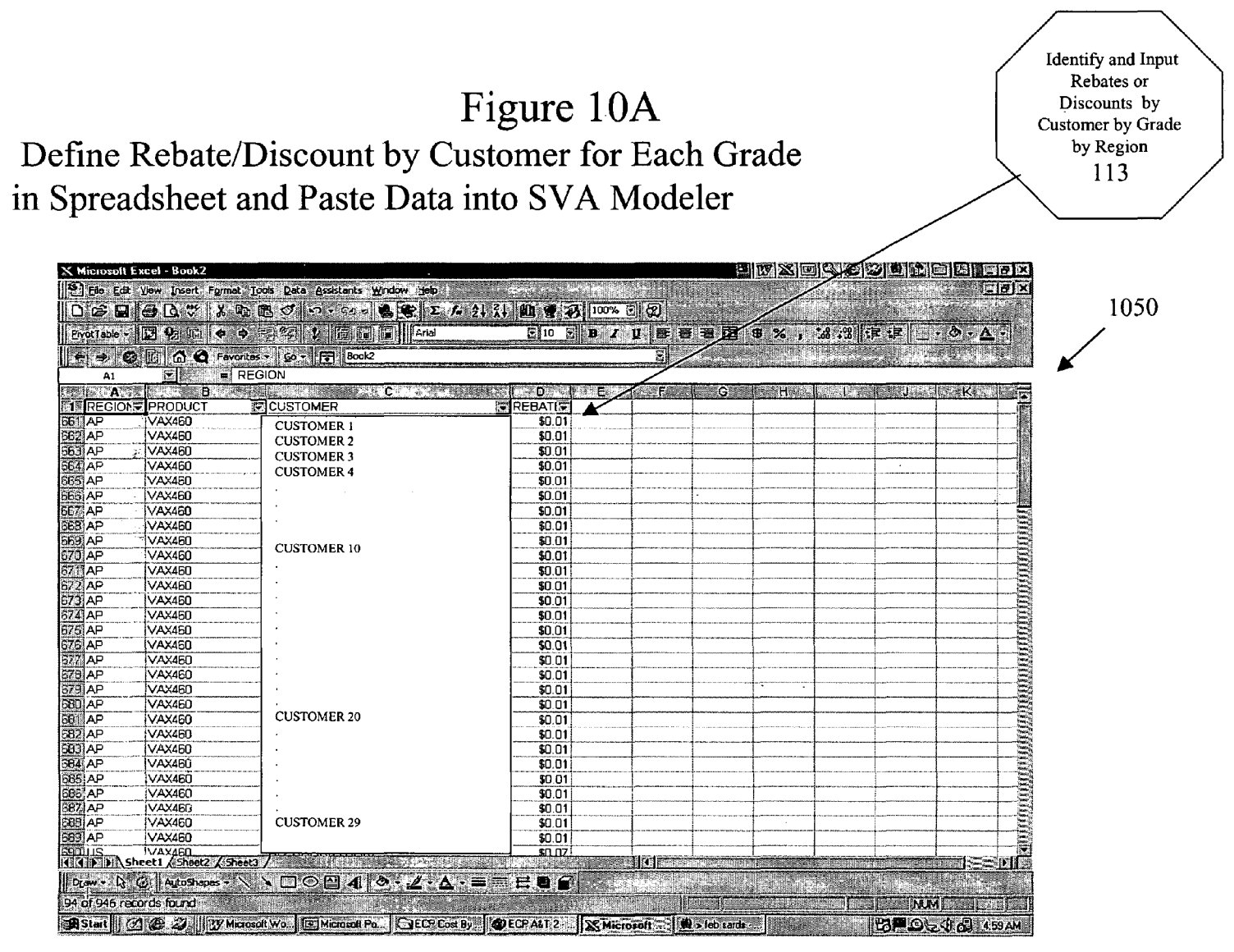

Figure 10A
Define Rebate/Discount by Customer for Each Grade in Spreadsheet and Paste Data into SVA Modeler Identify and Input Rebates or Discounts by Customer by Region
113

Input Freight and Duty By Product in Each Region
121

Input R&D and All Other Overhead Expenses, Total Capital (excluding Depreciation) Data By Product
122

Figure 14

![Screenshot of ECP A&T 2 - [Entry Query SARD by Major Product] database form showing columns: PRODUCT, MFG PER EXP. $, OTH PER EXP. $, BUS. MGMT. $, IT SERV. $, STAFF SERV. $, FPDE WW, R and D, $, MISC SARD, $, INVESTMENT, $ with rows filled with 100,000 values]

Callout: Input R&D and All Other Overhead Expenses, Total Capital (excluding Depreciation) Data By Product — 122

| REGION | REGIONAL FPDE, $ | WW SELLING | REGIONAL EFFORT BASED SELLING EXP, $ | REGIONAL TAX RATE, % | COMMENT $ |
|---|---|---|---|---|---|
| US | 100,000 | 100,000 | 1,000,000 | 35.26% | |
| SA | 100,000 | 100,000 | 1,000,000 | 36.50% | |
| CAN | 100,000 | 100,000 | 1,000,000 | 42.70% | |
| EUR | 100,000 | 100,000 | 1,000,000 | 33.15% | |
| MEX | 100,000 | 100,000 | 1,000,000 | 36.98% | |
| AP | 100,000 | 100,000 | 1,000,000 | 31.70% | |

Input Sales Expense, Warehousing Expense, and Tax Rates by Region
123

1650

Identify and Input Sales Expense Effort By Product by Region by Market Segment as % of Total Region Extra Sales Effort
124

Figure 17C

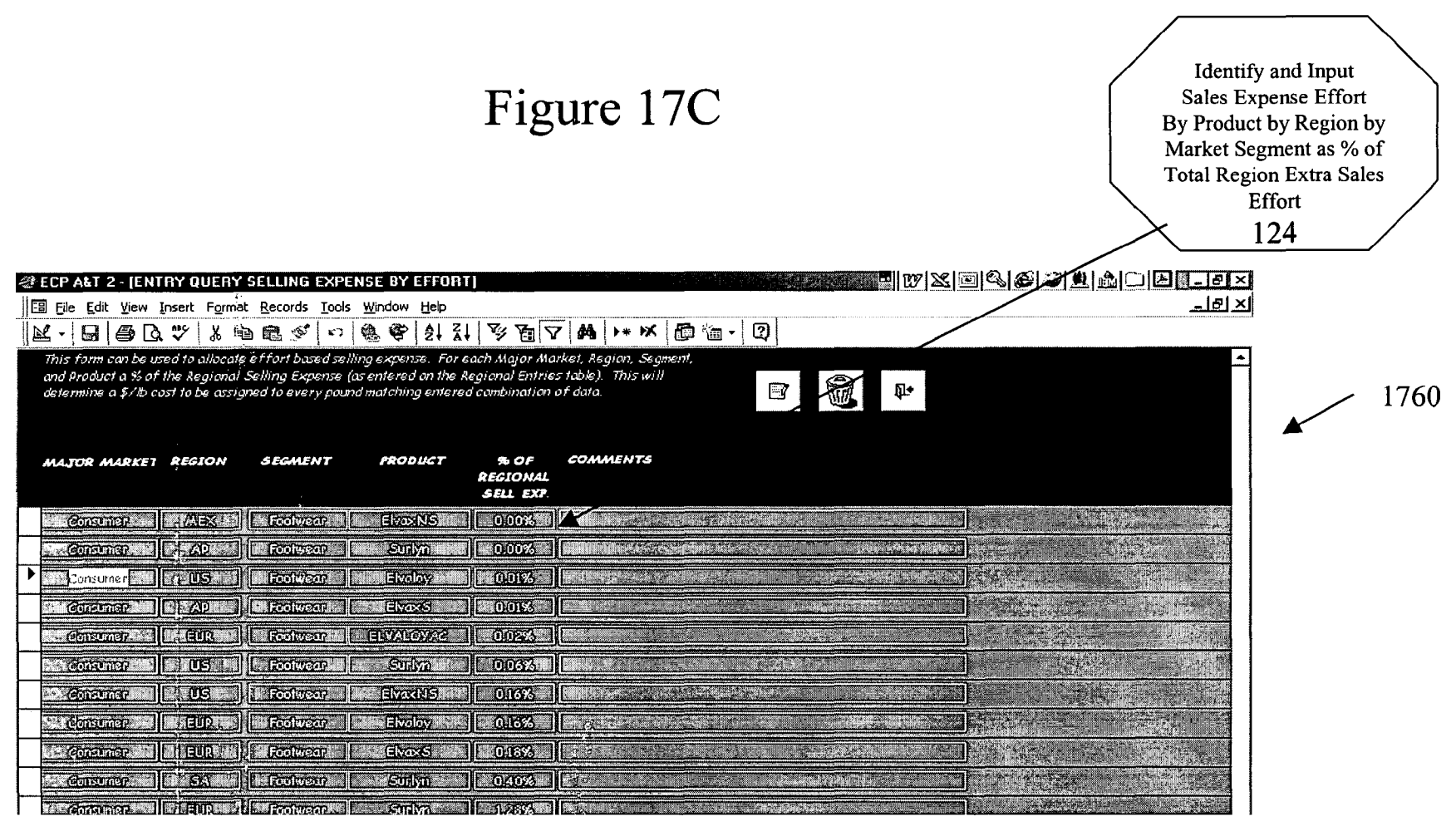

Identify and Input
Sales Expense Effort
By Product by Region by
Market Segment as % of
Total Region Extra Sales
Effort
124

Calculate Variable Contribution, Gross Contribution, After Tax Operating Income, Shareholder Value Added by Customer, Region, Grade, Segment
205

Figure 20

Load Data into Pivot Table Spreadsheet
206

CONFIDENTIAL - DESTROY USED COPIES

User Description: (Requested date range 01/01/01 - 03/01/02)

| Date | Product | Grade | Region | Customer | Major Market | Segment | Volume | Volume Rebate | Net Revenue |
|---|---|---|---|---|---|---|---|---|---|
| 2/1/02 | ELVAXN | VAX460 | AP | CUSTOMER 1 | Consumer | Footwear | 100,000 | .01 | 30000 |
| 3/1/02 | ELVAXN | VAX460 | AP | CUSTOMER 2 | Consumer | Footwear | 100,000 | .01 | 30000 |
| 1/1/02 | ELVAXN | VAX460 | AP | CUSTOMER 3 | Consumer | Footwear | 100,000 | .01 | 30000 |
| 2/1/02 | ELVAXN | VAX460 | AP | CUSTOMER 4 | Consumer | Footwear | 100,000 | .01 | 30000 |
| 1/1/02 | ELVAXN | VAX460 | AP | . | Consumer | Footwear | 100,000 | .01 | 30000 |
| 2/1/02 | ELVAXN | VAX460 | AP | . | Consumer | Footwear | 100,000 | .01 | 30000 |
| 2/1/02 | ELVAXN | VAX460 | AP | . | Consumer | Footwear | 100,000 | .01 | 30000 |
| 3/1/02 | ELVAXN | VAX460 | AP | CUSTOMER 10 | Consumer | Footwear | 100,000 | .01 | 30000 |
| 1/1/02 | ELVAXN | VAX460 | AP | . | Consumer | Footwear | 100,000 | .01 | 30000 |
| 2/1/02 | ELVAXN | VAX460 | AP | . | Consumer | Footwear | 100,000 | .01 | 30000 |
| 3/1/02 | ELVAXN | VAX460 | AP | . | Consumer | Footwear | 100,000 | .01 | 30000 |
| 2/1/02 | ELVAXN | VAX460 | AP | . | Consumer | Footwear | 100,000 | .01 | 30000 |
| 1/1/02 | ELVAXN | VAX460 | AP | . | Consumer | Footwear | 100,000 | .01 | 30000 |
| 3/1/02 | ELVAXN | VAX460 | AP | . | Consumer | Footwear | 100,000 | .01 | 30000 |
| 2/1/02 | ELVAXN | VAX460 | AP | CUSTOMER 20 | Consumer | Footwear | 100,000 | .01 | 30000 |
| 2/1/02 | ELVAXN | VAX460 | AP | . | Consumer | Footwear | 100,000 | .01 | 30000 |
| 3/1/02 | ELVAXN | VAX460 | AP | CUSTOMER 23 | Consumer | Footwear | 100,000 | .01 | 30000 |
| 1/1/02 | ELVAXN | VAX460 | AP | . | Consumer | Footwear | 100,000 | .01 | 30000 |

Figure 20A

Load Data into Pivot Table Spreadsheet 206

| | month | product | grade | REGION | CUSTOMER | market | segment | volume | rebate | revenue | var.cont |
|---|---|---|---|---|---|---|---|---|---|---|---|
| 2 | 1/1/02 | ELVAXNS | VAX460 | AP | CUSTOMER 1 | | Footwear | 100,000 | .01 | 30000 | 10,000 |
| 3 | 1/1/02 | ELVAXNS | VAX460 | AP | CUSTOMER 2 | | Footwear | 100,000 | .01 | 30000 | 10,000 |
| 4 | 1/1/02 | ELVAXNS | VAX460 | AP | CUSTOMER 3 | | Footwear | 100,000 | .01 | 30000 | 10,000 |
| 5 | 1/1/02 | ELVAXNS | VAX460 | AP | CUSTOMER 4 | | Footwear | 100,000 | .01 | 30000 | 10,000 |
| 6 | 1/1/02 | ELVAXNS | VAX460 | AP | . | | Footwear | 100,000 | .01 | 30000 | 10,000 |
| 7 | 1/1/02 | ELVAXNS | VAX460 | AP | . | | Footwear | 100,000 | .01 | 30000 | 10,000 |
| 8 | 1/1/02 | ELVAXNS | VAX460 | AP | . | | Footwear | 100,000 | .01 | 30000 | 10,000 |
| 9 | 1/1/02 | ELVAXNS | VAX460 | AP | . | | Footwear | 100,000 | .01 | 30000 | 10,000 |
| 10 | 1/1/02 | ELVAXNS | VAX460 | AP | . | | Footwear | 100,000 | .01 | 30000 | 10,000 |
| 11 | 1/1/02 | ELVAXNS | VAX460 | AP | CUSTOMER 10 | | Footwear | 100,000 | .01 | 30000 | 10,000 |
| 12 | 1/1/02 | ELVAXNS | VAX460 | AP | . | | Footwear | 100,000 | .01 | 30000 | 10,000 |
| 13 | 1/1/02 | ELVAXNS | VAX460 | AP | . | | Footwear | 100,000 | .01 | 30000 | 10,000 |
| 14 | 1/1/02 | ELVAXNS | VAX460 | AP | . | | Footwear | 100,000 | .01 | 30000 | 10,000 |
| 15 | 1/1/02 | ELVAXNS | VAX460 | AP | . | | Footwear | 100,000 | .01 | 30000 | 10,000 |
| 16 | 1/1/02 | ELVAXNS | VAX460 | AP | . | | Adhesive | 100,000 | .01 | 30000 | 10,000 |
| 17 | 1/1/02 | ELVAXNS | VAX460 | CAN | | | ? | 100,000 | .01 | 30000 | 10,000 |
| 18 | 1/1/02 | ELVAXNS | VAX460 | EUR | | | OthConsum | 100,000 | .01 | 30000 | 10,000 |
| 19 | 1/1/02 | ELVAXNS | VAX460 | EUR | | | Footwear | 100,000 | .01 | 30000 | 10,000 |
| 20 | 1/1/02 | ELVAXNS | VAX460 | EUR | | | ? | 100,000 | .01 | 30000 | 10,000 |
| 21 | 1/1/02 | ELVAXNS | VAX460 | EUR | | | OthGrowth | 100,000 | .01 | 30000 | 10,000 |
| 22 | 1/1/02 | ELVAXNS | VAX460 | EUR | | | Adhesive | 100,000 | .01 | 30000 | 10,000 |
| 23 | 1/1/02 | ELVAXNS | VAX460 | EUR | | | ? | 100,000 | .01 | 30000 | 10,000 |
| 24 | 1/1/02 | ELVAXNS | VAX460 | EUR | | | OthPkg | 100,000 | .01 | 30000 | 10,000 |
| 25 | 1/1/02 | ELVAXNS | VAX460 | EUR | CUSTOMER 20 | | Footwear | 100,000 | .01 | 30000 | 10,000 |
| 26 | 1/1/02 | ELVAXNS | VAX460 | EUR | | | Footwear | 100,000 | .01 | 30000 | 10,000 |
| 27 | 1/1/02 | ELVAXNS | VAX460 | EUR | CUSTOMER 23 | | ? | 100,000 | .01 | 30000 | 10,000 |
| 28 | 1/1/02 | ELVAXNS | VAX460 | EUR | | | OthPkg | 100,000 | .01 | 30000 | 10,000 |
| 29 | 1/1/02 | ELVAXNS | VAX460 | EUR | | | OthConsum | 100,000 | .01 | 30000 | 10,000 |
| 30 | 1/1/02 | ELVAXNS | VAX460 | EUR | | | Modifier | 100,000 | .01 | 30000 | 10,000 |
| 31 | 1/1/02 | ELVAXNS | VAX460 | EUR | | | Wire&Cable | | | $46.75 | |

Figure 21

Load Data into Pivot Table Spreadsheet
206

| | A | B | C |
|---|---|---|---|
| 1 | product | (All) | |
| 2 | grade | (All) | |
| 3 | CUSTOMER | (All) | |
| 4 | market | Consumer | |
| 5 | segment | Footwear | |
| 6 | | | |
| 7 | | month | |
| 8 | Data | 1/1/02 | Grand Total |
| 9 | Sum of volume | 1,000,000 | 2,000,000 |
| 10 | Sum of var.cont | 500,000 | 1,000,000 |
| 11 | Sum of gross cont | 200,000 | 400,000 |
| 12 | Sum of after tax Income | 100,000 | 200,000 |
| 13 | Sum of sva | 50,000 | 100,00 |

Figure 22

| MARKET | (All) |
| --- | --- |
| SEGMENT | Footwear |
| SUBREGION | (All) |
| KEY ECP CUSTOMER | (All) |
| MAJOR CUSTOMER | (All) |
| CUSTOMER | (All) |
| PRODUCT TYPE | (All) |
| PRODUCT | (All) |
| GRADE | (All) |
| Competition Type | (All) |
| MONTH | (All) |

| Data | REGION | | | | |
| --- | --- | --- | --- | --- | --- |
| | AP | EUR | LA | NA | Grand Total |
| Sum of VOLUME | 1,000,000 | 100,000 | 100,000 | 100,000 | 1,300,000 |
| Sum of REVENUE | 500,000 | 50,000 | 50,000 | 50,000 | 650,000 |
| Sum of ATOI | 100,000 | 0 | 0 | 0 | 100,000 |
| Sum of SVA | 0 | 0 | 0 | 0 | 0 |
| Sum of PRICE | .50 | .50 | .50 | .50 | .50 |
| Sum of VAR.CONT/LB | .10 | .10 | .10 | .10 | .10 |
| Sum of GROSS CONT/LB | .05 | .05 | .05 | .05 | .05 |
| Sum of ATOI/LB | .02 | 0 | 0 | 0 | .01 |
| Sum of SVA/LB | 0 | 0 | 0 | 0 | 0 |
| Sum of R&D (%REV) | 1 | 1 | 1 | 1 | 1 |
| Sum of SALES EXP (%REV) | 1 | 1 | 1 | 1 | 1 |

FOOTWEAR SEGMENT PERFORMANCE
SVA per unit vs. Volume

PROCESS FOR CALCULATING THE ECONOMIC VALUE CREATED BY A BUSINESS ACTIVITY

BACKGROUND OF THE INVENTION

Field of the Invention

A business process that collects data for multiple business activities from diverse sources, and facilitates the calculation of economic value added for these specific business activities.

In order to make pricing decisions, a business has an ongoing need to understand its real costs. With knowledge of real costs the business management can determine what effect changing a price charged to a particular customer, or to a particular market or market segment, or within a particular region, will have on the profitability of the business.

Many manufacturing operations are capable of producing various types of products using the same manufacturing equipment. Historically manufacturing costs have been hand calculated by various people at the manufacturing sites, who would then generate a table of the "cost by type" of product, that is, the cost of each specific product or specific grade of product. For each grade of product, these costs were reported to the overall business manager as "fixed cost", "variable cost", along with the "effective production rate" of the product. The shipping costs, usually called "freight and duty" were accounted for on a regional basis.

Profit on a particular sale was then calculated by first adding the regional freight and duty to the sum of the fixed cost and variable cost to produce a "total cost". This total cost was then subtracted from the selling price, to determine a measure of profitability called "manufacturing contribution". With these data, a product manager could then calculate what the manufacturing contribution was for each grade of product sold to all customers or to a particular customer based on the difference in selling price or distribution costs.

However, this "manufacturing contribution" term did not account for non-manufacturing fixed cost, taxes, and cost of working capital. This shortcoming made it difficult to calculate after tax earnings of a specific sale of product to a customer or group of customers. Businesses typically accounted for these other fixed costs separately. To account for these fixed costs different individuals were typically involved and completely separate databases (or even a separate computer system), such as a global financial database (known as a GFDB) and sales databases (known as a SDB), further complicated matters. To determine after tax operating income (ATOI), these other fixed costs had to be extracted from the separate database for each product family and then subtracted from the manufacturing contribution to obtain a net before tax profit. This net before tax profit was then further reduced by subtracting the effective tax rate for the business (typically about 30-40%). FIG. 1 shows an example of such a prior art calculation.

While the prior art ATOI calculation method described above provided a measure of profitability, it did not provide an actual estimate of the real cost of a particular business activity, such as selling a particular grade of product to a particular market. The prior art methods typically used an average selling cost calculated over all grades or over all markets. To make the prior art calculations manageable a simplifying assumption was typically made that every unit of product had the same selling cost within a geographical region. This assumption obviously failed to account for different sales effort that was applied to different markets or customers and failed to account for the sales support provided by a central region to satellite regions. Another shortcoming of the prior art ATOI calculation method was that the calculation failed to account for the return on working capital and investment in the business. Thus the prior art ATOI calculation did not provide a good determination of whether a particular activity, such as a sale of a particular product, increased or decreased the profitability (i.e., the economic value) of the business.

To determine economic value added of a particular activity (such as a sale of a product) the actual sales expense or effort applied to achieve that sale is needed. This actual expense or effort includes: selling effort, research and development (R&D) effort, and technical service effort. The specific tax rates for the region in which the sale occurred (as well as the tax rates where the manufacturing occurred), the amount of working capital required to maintain inventory, the plant investment to support the sale and the cost of capital also had to be accounted for.

A historically difficult process was to collect the sales data for each accounting period (typically a year) and assign each sale to a market and a market segment. While sales data could be routinely extracted from a global sales database, the sales and marketing personnel had to identify the market in which the sales belong. Historically this was done relatively infrequently, such as every three to four years.

Historical efforts to determine economic value added by product and market were carried out by periodically (typically no more than three to four years) surveying the business organization to determine which sales belonged in which markets, and to determine how people in the business were dedicated or allocated to these sales. For a diversified manufacturing or marketing business this could be an extensive effort involving several million dollars of expense. Typically a consultant was engaged for this effort, which necessitated a consultant fee, plus a sizable cost for the people within the business who had to provide information and support to the consultant. From this survey a so-called "waterfall chart" was created that illustrated economic value added by product and market. The waterfall chart could be used to develop a growth strategy for the business that drove the future investments.

However, as soon as such a study was completed it became outdated, since business is dynamic and constantly changing. In order to re-organize a diversified business by market instead of by product, a method is needed to again provide economic value added. Such an extensive effort to analyze the business and develop a new measure of economic value added typically took over a year to complete. And as conditions continued to change, such as costs of key raw materials and currency exchange rates, it became difficult for a business to determine where (i.e., markets or regions) and on what products the profit was being generated.

Large scale, all encompassing, so-called integrated software systems, such as "mySAPsem" by SAP, and Oracle7 by Oracle Corporation, as well as software from other sources, have been marketed to collect information into a central system capable of calculating the desired parameters discussed above. Such integrated software systems typically require expensive computer resources and extremely large amounts of data storage and are so complex that extensive training is required for the persons using the systems.

Deficiencies of Prior Art Integrated Software Systems

Integrated software systems from SAP and ORACLE can provide results discussed above. However, these integrated systems typically have the following drawbacks:

1. All existing computer systems must be replaced with a single computer system.
2. Integrated systems typically take years to implement. Once a changeover to such a system is made it has to work or the business effectively shuts down.
3. Integrated systems are expensive, costing tens of millions of dollars.
4. Integrated systems can be inflexible, requiring changes to be made to the entire system to get the desired results. As an example, if an integrated system is implemented for only one region, to get global results the systems in other regions must be changed over to the integrated system.

Thus there exists a need for a process that provides a near real-time assessment of the economic value added of a business at all levels, that requires only modest desktop computer and data storage resources, and that utilizes common interfaces (such as spreadsheets) familiar to many users. The present invention provides such a process to assess the economic value added of business activities at all levels.

Advantages of the Present Invention

When compared to prior art integrated software systems, the present invention:
1. Permits continued use of existing desktop computer systems from which the data is then fed into the computer program that implements the method.
2. Can be implemented in weeks, and updated in hours or days.
3. Uses readily available, inexpensive, desktop software and has been implemented with only a part time effort of a few employees.
4. Is flexible in that it can accept the data from any existing computer system to achieve global results.

The present invention improves the quality and timeliness of the "cost by type report" (mentioned above) by inputting the business activity data, such as manufacturing detail, into a single relational database in a common format. Updates of business activity (data manufacturing cost by type or grade, etc.) data may be achieved much more easily than prior art systems.

Although the present method has been implemented using the Microsoft Access relational database and Excel spreadsheet software, other personal computer relational database systems and spreadsheet software may be used.

Definition of the Terms

As used herein the term "aggregate cost" or "aggregate cost of manufacture" of a product means cost averaged over all sources (i.e., different manufacturing units or locations) of that product. Costs associated with a specific asset (i.e., a manufacturing unit, also generally termed equipment) may be based on the fraction of time that a product occupies that specific asset or upon the volume fraction of product that occupies the asset.

As used herein the term "manufacturing contribution", also known in the art by the term "gross contribution", means the selling price per unit, less the total of any rebates or discounts, less freight and duty, less the fixed and the variable manufacturing costs, all multiplied by the sales volume. Expressed as an equation:

$$MC_{unit} = (P_{unit} - R_{unit} - FD_{unit} - VMC_{unit} - FMC_{unit})$$

$$MC = MC_{unit} \times SV$$

where $MC_{unit}$ is Manufacturing Contribution per unit of product (items, pounds, kilograms, etc.), MC is total Manufacturing Contribution, $P_{unit}$ represents the price per unit, $R_{unit}$ represents any rebates or discounts per unit, $FD_{unit}$ represents freight costs and duty per unit, $VMC_{unit}$ represents variable manufacturing cost per unit, $FMC_{unit}$ represents fixed manufacturing cost per unit, and SV represents sales volume, i.e., total units sold.

Another way to define Manufacturing Contribution or Gross Contribution is the Pre-Tax Earnings of a Sale, if one were to assume that the sale only carried with it manufacturing and freight/duty costs. Manufacturing Contribution is a good way to rank which sales are the most profitable to the business, if it is assumed that selling and other non-manufacturing fixed costs needed to gain and hold a sale are equal. It can also indicate which sales a business should put the most resources on, and which sales are not worth the resources.

As used herein, the term "Economic Value Added" (EVA), sometimes called "Shareholder Value Added" (SVA), measures the economic profit or value added by a business after recognizing the all costs including cost of capital related to the investment in net operating assets employed by the business. EVA indicates whether a business has sufficient earnings in a period to cover all operating expenses, including the cost of capital for its investment, as well as to repay some of the capital previously invested (depreciation) with the surplus, if any, creating added value. Expressed as an equation:

$$EVA = ((MC_{unit} - SC_{unit} - RD_{unit} - OC_{unit} - AC_{unit}) \times (1 - TX) - (NRA_{unit} \times CC)) \times SV$$

where SC is selling cost, RD is research and development cost, OC is one time charges for the period, AC is administration cost, TX is the effective tax rate, NRA is net RONA assets (Accounts Receivable−Accounts Payable+Inventory+Permanent Investment−Depreciation) and CC is the average cost of capital. RONA is the commonly used Return On Net Assets.

Economic value added is therefore the net profit generated by a business activity after all of the associated business costs have been subtracted, the effective taxes have been subtracted and the cost of capital has been accounted for.

In order to focus business efforts in a way that maximizes the inherent value of the business and ultimately return to shareholders, a metric called SVA (shareholder value added) is commonly being used today. SVA by definition is after tax income minus cost of capital. In essence then, a business manager can define how his or her business is surpassing the cost of capital and driving up earnings in a way that will increase the inherent value, and thus the stockholder value and ultimately the share price of the stock.

Defining SVA on a major business is relatively easy, but the key to increasing SVA is to know the SVA for each customer or collection of customers in a market segment, and then implementing strategies and tactics to increase SVA at these customers in these markets segments. Indeed, the more complex a business becomes, the more difficult it is to define SVA for each customer transaction.

Many diversified manufacturing businesses can be extremely complex. Such businesses have multiple manufacturing units, each unit having different costs to make products and grades that vary in composition, production rate, and yield. Different products and different grades of those products are sold into many markets and market segments in regions around the world.

It is typical that multiple products are sold to the same customers. Conversely, it is also typical that some customers buy the same grade product for multiple end uses market segments. Selling costs, R&D costs, and administrative costs may be concentrated in the business home region, which support sales in other regions or such costs may be distributed in different regions.

As a result, a diversified business has difficulty defining how each transaction with a customer impacts SVA, and even more difficulty developing strategies and tactics to maximize SVA.

SUMMARY OF THE INVENTION

The present invention is a method or process of computing an economic value created by a particular business activity, the method comprising, in sequence, the steps of:

a) calculating an aggregate cost of a product manufacture or acquisition activity;

b) selecting one or more parameters, the parameters comprising a customer, a sales region, a product grade and a market segment c) calculating a sales volume and a net price related to the one or more parameters;

d) calculating a manufacturing contribution related to the one or more parameters;

e) calculating an after tax operating income related to the one or more parameters;

f) calculating an economic value added related to the one or more parameters, thereby determining the economic value created by the particular business activity.

The process of the present invention is organized in a computational hierarchy that first collects cost, production and sales data and organizes these data in a common format, then computes, in a sequential manner, manufacturing costs, then manufacturing contribution, then ATOI, and finally computes economic value added for a selected business activity, such as manufacturing and selling a particular product. Data may be checked for discrepancies immediately after entry, so that erroneous calculation results are not created.

The cost, production, and sales information is extracted from various data sources and then loaded into tables or predefined fields in a single database in a common format. A program module successively calculates, in a hierarchical manner, manufacturing cost, manufacturing contribution, ATOI and finally computes economic value added (EVA) in accordance with the equations set forth above. The user defines the results to be presented by entering parameters into an electronic "form", such as a spreadsheet or a spreadsheet pivot table. The program module presents the results to the user in a user-selectable graphical format, such as those available within spreadsheet software packages. The graphical presentation enables a user, such as a business manager, to visualize the calculated results make decisions.

The process of the present invention requires an ongoing periodic (typically monthly) update of relatively few changes per time period to reflect new sales and newly introduced products. Using lookup techniques common to the software industry the data may be extracted from the data source and loaded into one or more spreadsheet tables in a standardized format. Costs that fluctuate frequently, such as raw materials costs, can be input as each change occurs. Other more routine fixed costs that fluctuate infrequently, such as on a year to year basis, are therefore not updated as frequently.

With these updated data, the process of the present invention can calculate the EVA report as often as desired, for example on a monthly basis, instead of once every several years. The present process can identify which sales are contributing to economic value added on a month to month and year to year basis, as needed.

The full implementation of this process creates new "pivot tables" and "waterfall" charts for the Market Segment managers. See FIGS. 23 and 24. These charts present a tabular and graphical representation of results of EVA in comparison to the selected parameter (market segment, customer, etc.). The pivot tables and waterfall charts help a business manager to define which sales are driving economic value added, and assist in developing pricing strategies and determining how to allocate sales efforts and other efforts which lead to long term profitable growth of a business.

Historical data may be used to visualize growth trends of a business by market, by region, by segment, by customer, by product type, even by product grade. From this historical data business management can determine the source of growth or decline, and define where the business needs to focus its resources further to drive earnings growth. The present invention is a business management tool that defines the impact that a sale or group of sales has ultimately on the company's inherent value. Knowing this, business management can then more effectively manage business activities associated with such sales in a way the will increase the company's inherent value and ultimately the price of a company's stock.

The impact that economic value added has on the price of a company's inherent value is typically termed shareholder value added in the prior art and is abbreviated as "SVA". The present invention is believed to provide higher quality information than that obtained from more expensive integrated software systems (i.e. SAP), and does so at a dramatically lower cost. This dramatically lower cost is achieved by use of a software module that is programmed in Visual basic and is built onto a relational database. The relational database then accepts tabulated data from existing non-integrated databases (such as a GFDB and SDB), and calculates economic value added (EVA).

In prior art integrated software systems (such as SAP and other mainframe software systems), entire databases have to be programmed to replace existing database systems at huge expense. This conversion typically involves numerous computer and business specialists over extended periods of time, and requires a startup period in which system failures need to be troubleshot. This present invention does not require any database systems to be replaced and indeed can use data from any database system including data from SAP.

The present invention requires only about 200 megabytes of data storage on a personal computer, thus requiring no new equipment for a typical user. In addition, it can be updated and maintained by anyone that is trained to use the particular relational database and spreadsheet software in which the invention is implemented. SAP and SAP system upgrade require expertly trained and experienced programmers.

The present invention achieves higher quality data than integrated software systems, such as SAP, because it provides the flexibility to distribute costs across families of products based upon shared use of assets, rather than penalizing the product being manufactured at the time an unexpected cost occurs.

The present invention is believed novel because:
1. The present invention is able to accept tabulated data from any source, thus allowing the use of data from previously incompatible computer systems to be merged for the EVA calculation.
2. The present invention has a multiple calculation staging process that allows it to pull and calculate large amounts of data from multiple tables. Without the sequential calculation method of the present invention, normal query operations with large amounts of data typically would cause operability problems, such as crashes, of the relational database software.

3. The present invention comprises error logic that is critical for trouble shooting. An error report is compiled that aids in identifying missing or erroneous information.
4. The present invention has the ability to archive the relational database (e.g. Access®) data files within security protocols.
5. The present invention has the ability to reconcile the cost of manufacture of internally produced grades with the raw materials list.
6. The present invention does all of the above loaded onto inexpensive desktop relational database software (e.g., Microsoft Access®). The system may be implemented in a single computer or multiple computers linked by a system network, requiring only about 200 megabytes of storage per computer.

The present invention was created for and has been tested using production data for an extremely complex business that manufactures a highly diverse family of products produced in multiple facilities and sells those products in a wide range of markets and applications. It is believed that the present invention may be adapted to any particular business activity, either simple or complex, thus providing business value that extends beyond a purely manufacturing environment.

BRIEF DESCRIPTION OF THE FIGURES

FIG. 3 shows a "Main View" form for selecting information management options;

FIG. 5A shows a form for inputting raw materials cost for each ingredient on each production unit;

FIG. 6A shows a form for adding or editing grades to cost by product type;

FIG. 7 shows an annotated version of the view of FIG. 3 where the icon for the "volume of each grade per unit" has been selected;

FIG. 7A shows a format for loading volumes of product volume by manufacturing unit;

FIG. 8 shows a format for loading sales data from another database and identifying market segment for each customer, region and product grade;

FIG. 9A shows a typical listing of entries of sales data arranged by product;

FIG. 10A shows a typical listing of rebates or discounts by customer arranged by region and product type;

FIG. 11A shows a format for loading freight and duty from a GFDB;

FIG. 13 shows a form for selecting input of R&D and other overhead expenses by product;

FIG. 14 shows a form for loading overhead expenses from a GFDB;

FIG. 16A shows a form showing entries of selling expense, warehousing expense, and tax rates by region;

FIG. 17C shows a form for selecting the input of sales expense effort as a percentage of total region sales effort;

FIG. 19 shows a form for selecting the report options desired;

FIGS. 20 and 20A show examples of reports in a table format that can be loaded into a pivot table for graphical presentation;

FIG. 21 shows an example of a report in a table format reporting the economic value added (EVA) for a given month in a particular segment of a market.

FIG. 22 shows an example of a numeric table output in pivot table format;

DETAILED DESCRIPTION OF THE INVENTION

Figure 1:
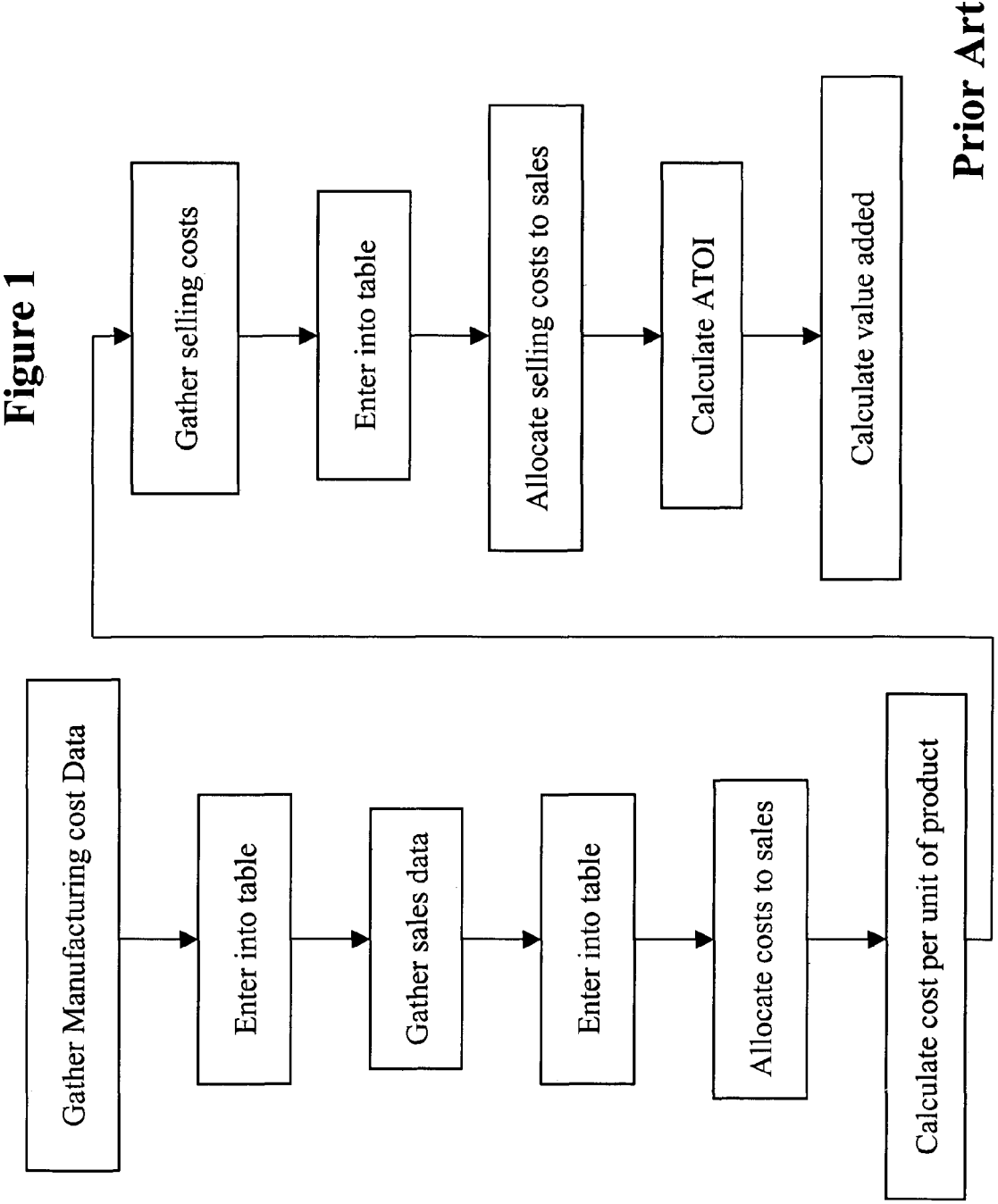
FIG. 1 is a block diagram showing a manual prior art calculation method.
Figure 2:
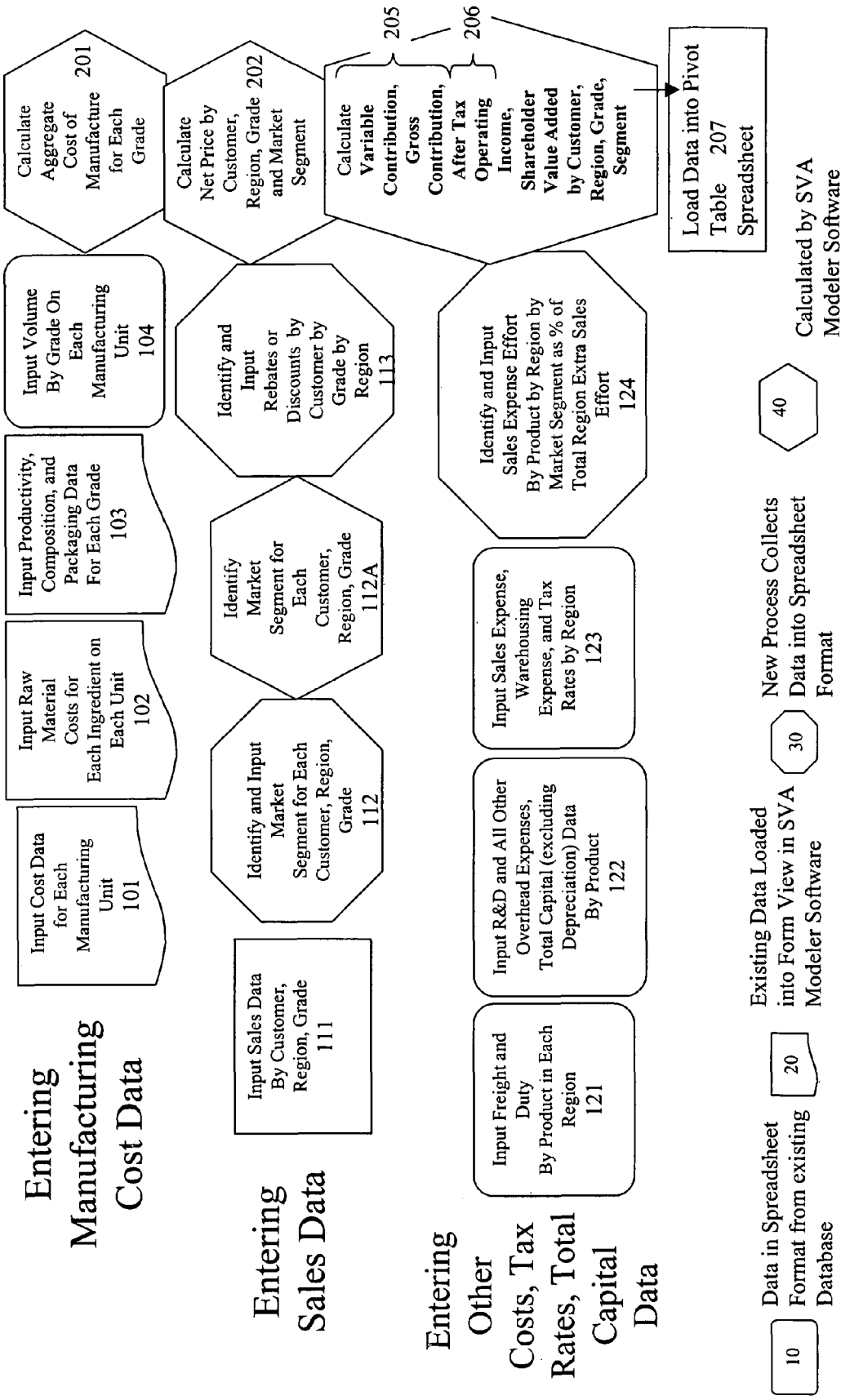
FIG. 2 is a block diagram showing the process flow of the present invention.

Throughout this description reference numerals are used to identify items and functions shown on multiple figures. FIG. 2 is a block diagram showing the process flow of the present invention. Three main groups of data: "manufacturing cost data", "sales data", and "other cost, tax rates and capital data" are required to calculate the economic value added of a business activity. The legend at the bottom of FIG. 2 shows three methods used to acquire the data: spreadsheet format from existing database (rectangular boxes 10), existing data loaded into a Form View (rectangular boxes 20), new process collects data into spreadsheet format (octagonal boxes 30); and the values calculated by the method (hexagonal boxes 40).

The top row of boxes in FIG. 2 illustrate a method of calculating an aggregate cost of a product manufacture or acquisition activity 201. Cost data for each manufacturing unit is input 101, raw material costs for each ingredient of each unit is input 102, productivity, composition, and packaging data for each product grade is input 103, volume by grade of each manufacturing unit is input 104.

The middle row of boxes in FIG. 2 illustrate a method of calculating a sales volume and a net price 202. These calculations are related to one or more parameters selected by the user, the parameters comprising a customer, a sales region, a product grade and a market segment, as will be discussed in conjunction with FIG. 18. Sales data by customer, region and grade is input 111, market segment is identified for each customer, region and grade 112, rebates or discounts are input by customer, region and grade 113. Once a market segment has been initially entered for each customer region and grade 112, subsequent sales to that customer are automatically identified 112A.

The bottom row of boxes in FIG. 2 illustrate a method of calculating a manufacturing contribution related to the one or more parameters 205, calculating an after tax operating income related to the one or more parameters 206 and calculating an economic value added for the one or more parameters 207. Freight and duty is input for each product in each region 121, R& D costs, other overhead expenses, and total capital investment is input 122, sales expense, warehousing expense and tax rates are input by region 123, and sales expense effort is identified by product, by region and by market segments 124.

Figure 2A:
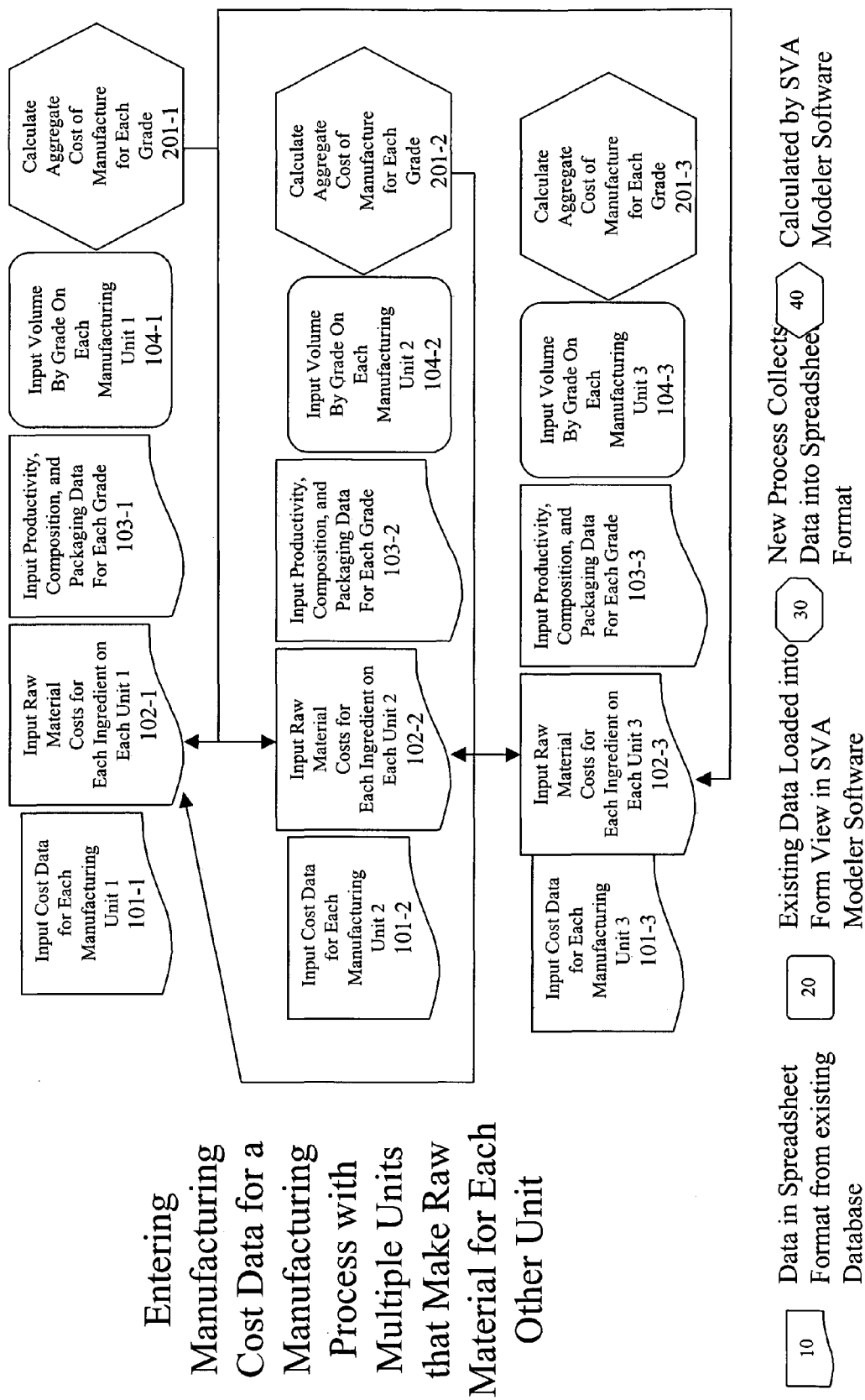
FIG. 2A is a block diagram showing the process flow of the present invention for a process having multiple manufacturing units.

FIG. 2A is a block diagram showing the process flow of the present invention for a process having multiple manufacturing units. Each horizontal row of boxes in FIG. 2A generally correspond to the top row of boxes in FIG. 2. Three manufacturing units are shown (Units 1, 2, and 3). Cost data for manufacturing unit 1 is input 101-1, raw material cost for each ingredient of unit 1 is input 102-1, productivity, composition, and packaging data for each product grade is input 103-1, and volume by grade of manufacturing unit 1 is input 104-1. Aggregate cost of manufacture for each grade is calculated in box 201-1. In a similar manner manufacturing unit 2 has cost data 101-2, raw material cost 102-2, productivity, composition, and packaging data for each product grade is input 103-2, and volume by grade 104-2. Aggregate cost of manufacture for each grade is calculated in box 201-2. Manufacturing unit 3 has corresponding inputs designated by suffix-3 (i.e., 101-3, 102-3, 103-3, 104-3). The particular process illustrated has three manufacturing units, where units 1 and 2 are manufacturing products that are consumed by manufacturing units 1, 2, and 3. The process of calculating aggregate cost of manufacture for each grade is discussed below in conjunction with FIG. 25.

Although data entry has been typically illustrated using spreadsheets (e.g., Excel®) because of their general acceptance by the user community, alternate methods may be used. FIG. 9B, for example, shows an alternate method for identifying market and segment for each customer, region and grade using a form view within the relational database (e.g., Access®).

Figure 2B:
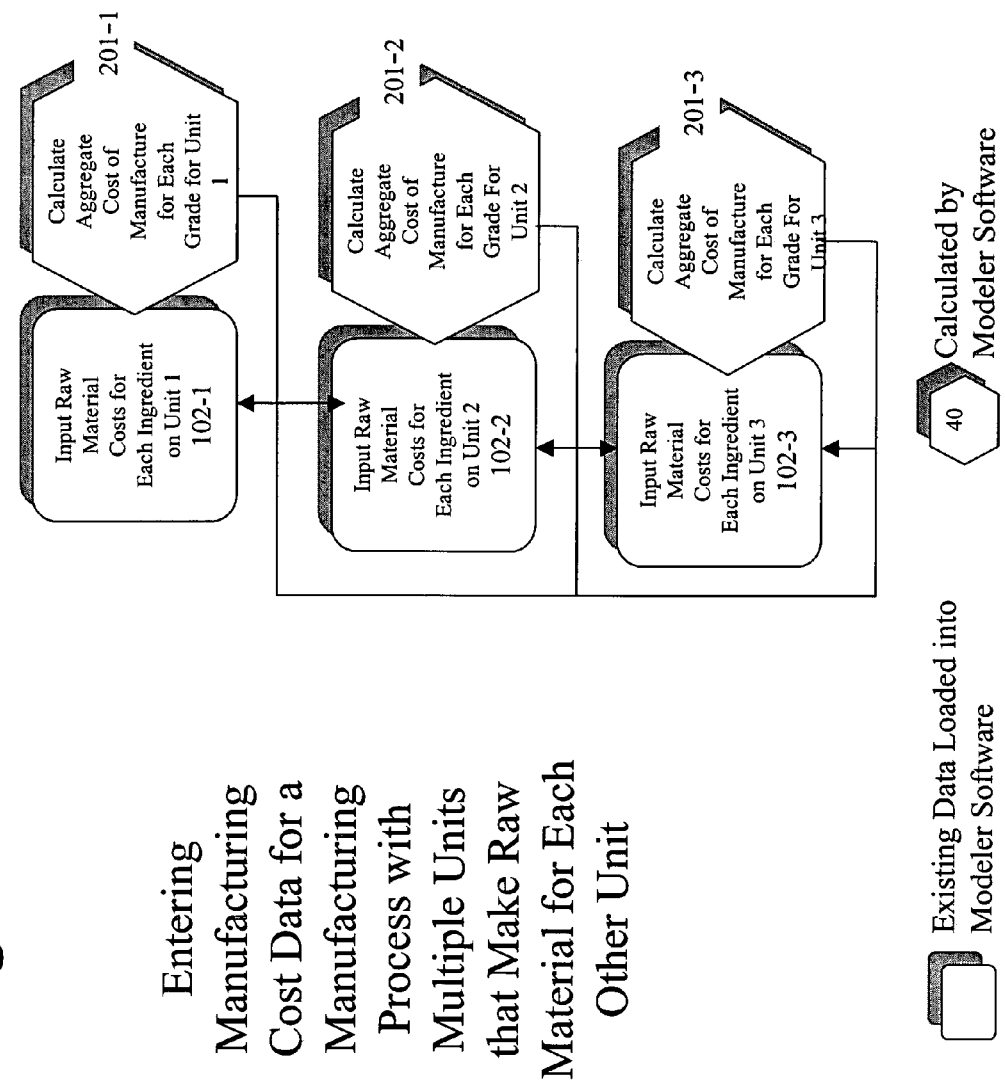
FIG. 2B is a block diagram showing the process flow of cost data for a process having multiple manufacturing units.

FIG. 2B is a block diagram showing the flow of cost data in the present invention for a process having multiple manufacturing units. The process of calculating aggregate cost of manufacture for each grade is discussed below in conjunction with FIG. 25.

FIGS. 3 through 19 illustrate forms used by the user to interact with the functional boxes shown in FIG. 2. FIG. 3 shows a "Main View" form 300 for selecting information management options. Two main options "cost-by-type" 301 and "Manufacturing Contribution/ATOI/SVA" 302 are provided. Icons within the "cost-by-type" option 301 are "product grade enter/edit 310, "mass data entry" 320, "report options" 330, and "global entries 340. Within the "cost-by-type" option 301 is a pull down menu of manufacturing units to choose 303. Icons within the "Manufacturing Contribution/ATOI/SVA" 302 are "report options" 350 and "mass data entry" 360.

Figure 3A:
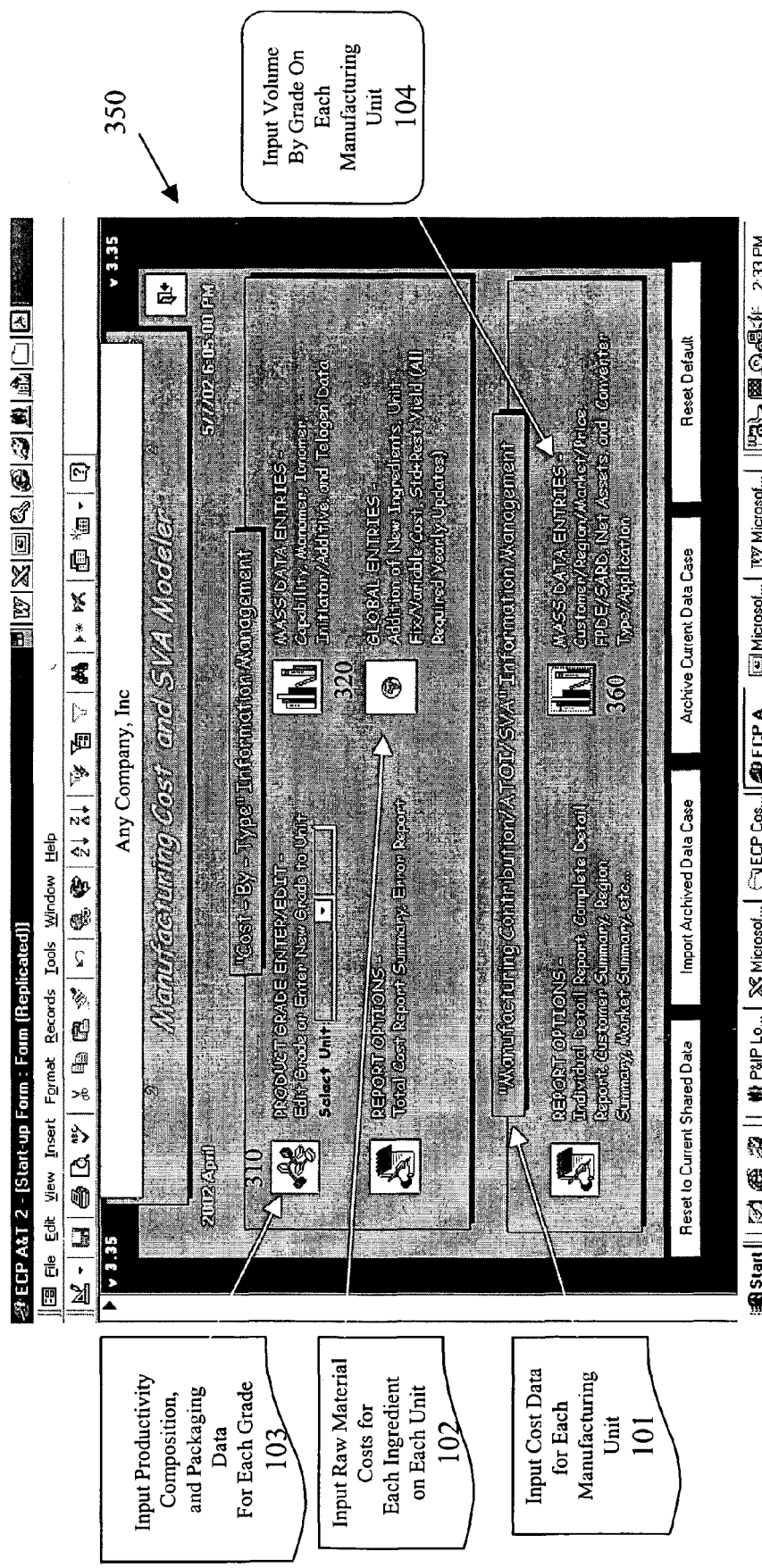
FIG. 3A shows an annotated version of the view of FIG. 3 showing icons for selection of type of information management desired.

FIG. 3A shows a form 350, which is an annotated version of the view of FIG. 3 showing icons for selection of type of information management desired. FIG. 3A implements the functions of boxes 101, 102, 103, and 104 of FIG. 2. Arrows connect the boxes 101, 102, 103, and 104 of FIG. 2 to the corresponding icons 320, 320, 310, and 360.

Figure 4:
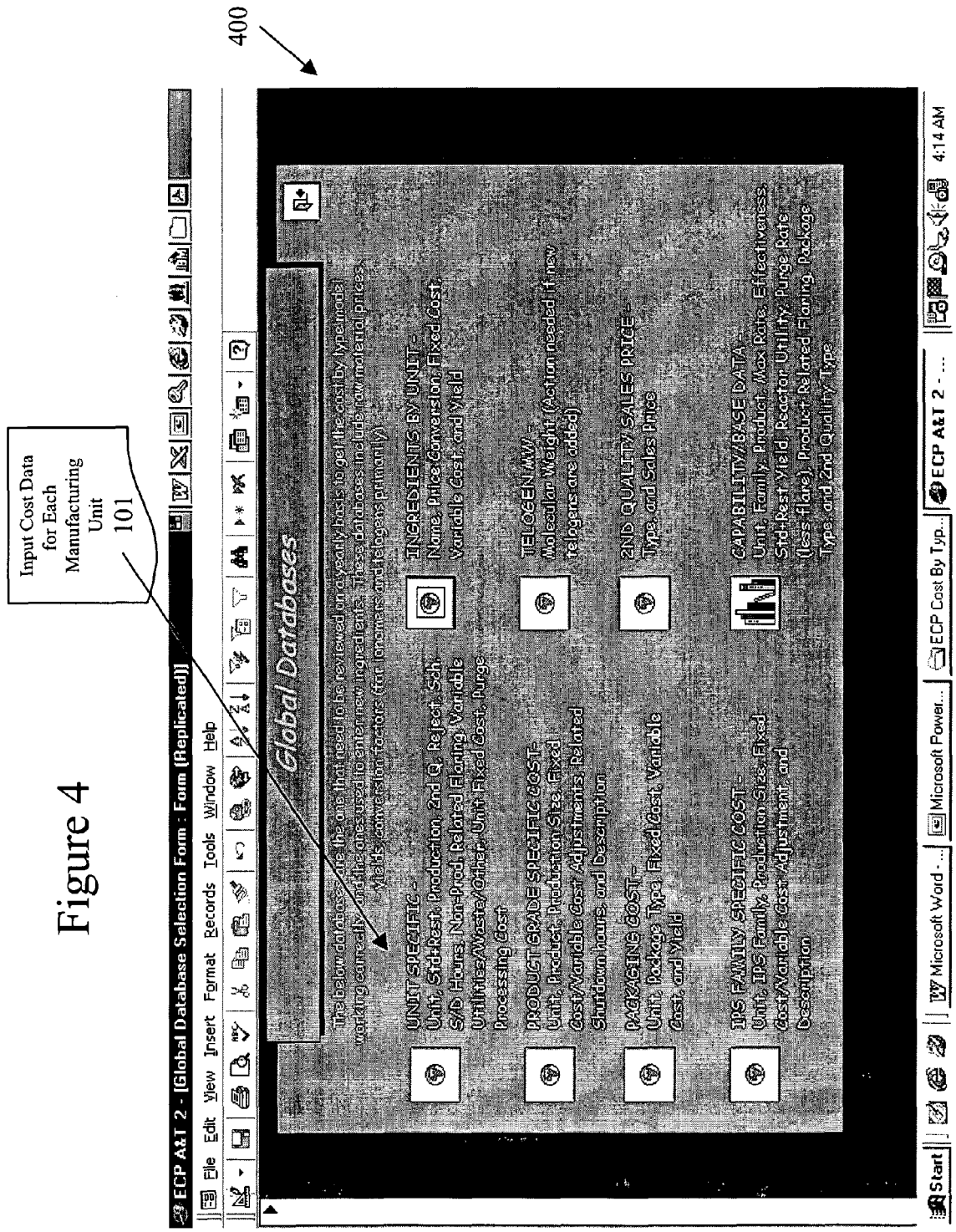
FIG. 4 shows a form for selecting global databases icon for entry and updating of cost data has been selected.

FIG. 4 shows a form 400, which is presented to the user when the "global databases" icon 320 of FIG. 3 is selected. The form 400 is used for entry and updating of cost data. Implementation of the function of box 101 is shown by an arrow connecting box 101 to the icon "unit specific".

Figure 4A:
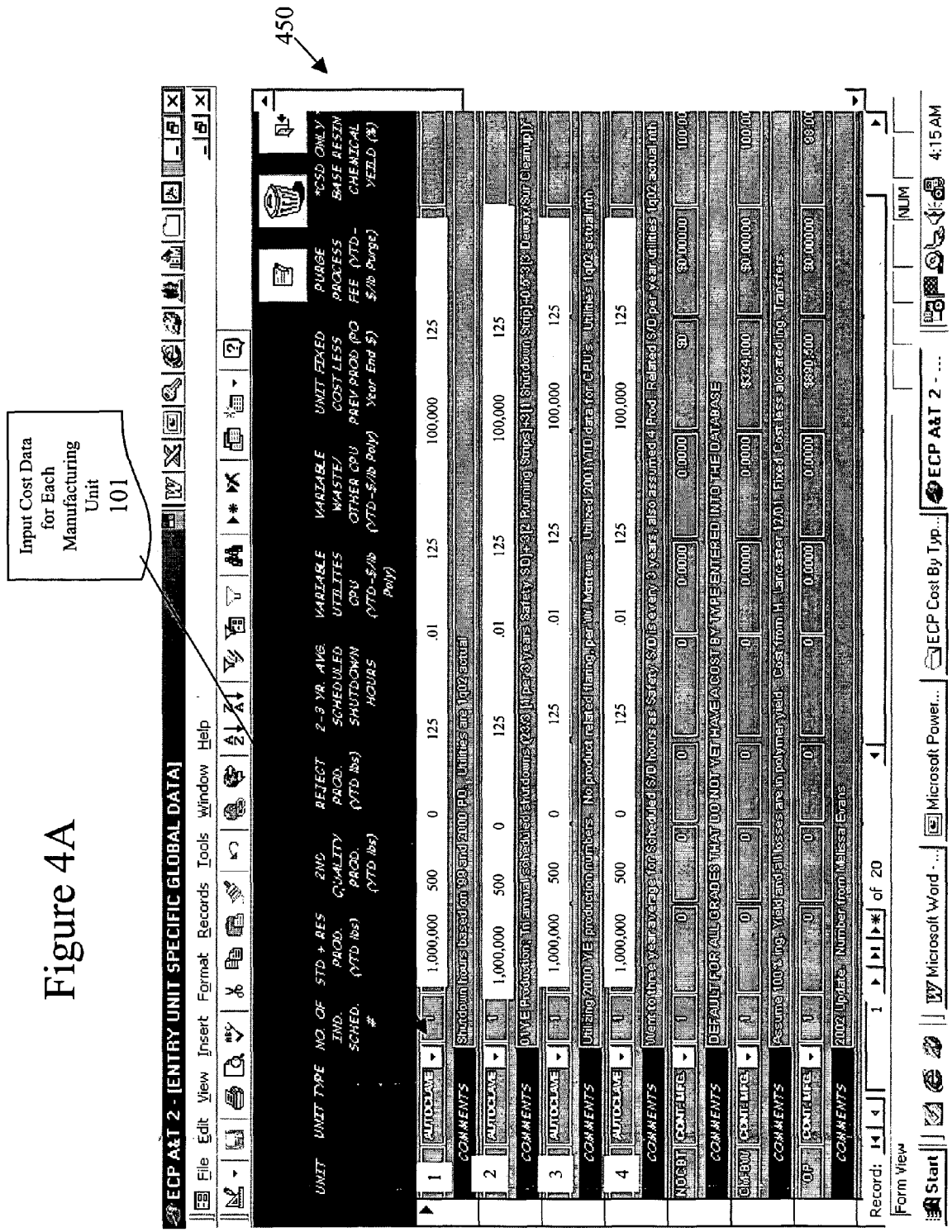
FIG. 4A shows a form for inputting cost data for each manufacturing unit.

FIG. 4A shows a form 450 for inputting cost data for each manufacturing unit which is presented to the user when the "unit specific" icon of FIG. 4 is selected. Entries are made in a tabular format, identifying (from left to right): the production unit (labeled as 1,2,3,4, NOCBT, CMBW, and OP), the unit type (autoclave or continuous manufacturing), the number of individual scheduled production runs, standard product production volume (year to date in pounds YTDlbs), second quality production volume, reject production volume, average scheduled shutdown hours, variable utilities costs per unit of production (year to date in dollars per pound), variable waste and other cost per unit of production, etc. The triangles to the right of certain fields (such as unit type) indicate that a pull down menu of the available selections should be used.

Figure 5:
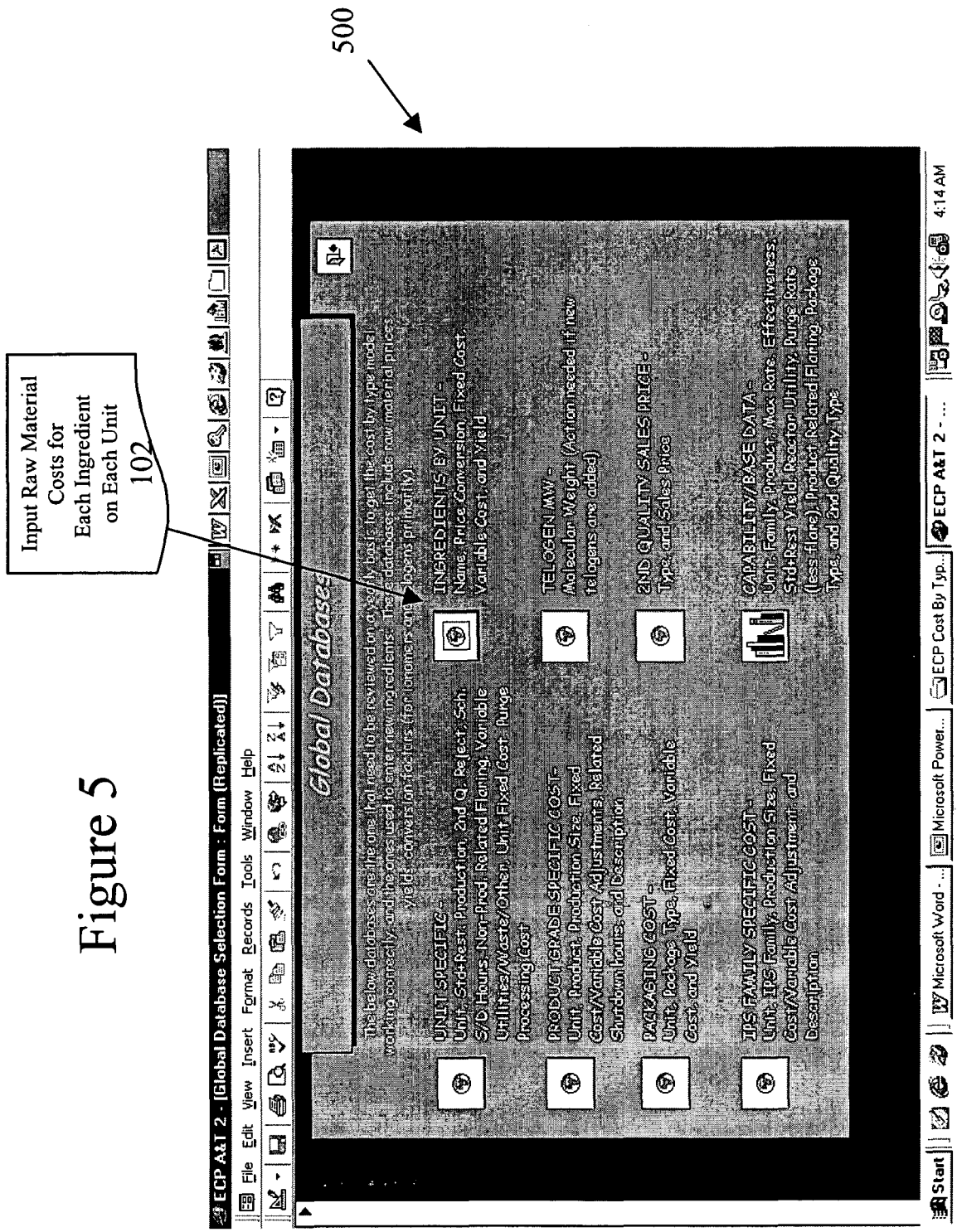
FIG. 5 shows the form for selecting global databases where the icon for entry of raw materials cost has been selected.

FIG. 5 shows a form 500, which is presented to the user when the "global entries" icon 340 of FIG. 3 is selected. Implementation of the function of box 102 is shown by an arrow connecting box 102 of FIG. 2 to the icon "ingredients by unit".

FIG. 5A shows a form 550 for inputting data from selected global databases when the icon "ingredients by unit" of FIG. 5 has been selected. Entries in form 550 are made in a tabular format, identifying (from left to right): production unit, material name material yield in percent, price conversion, fixed cost, variable cost, and comments.

Figure 6:
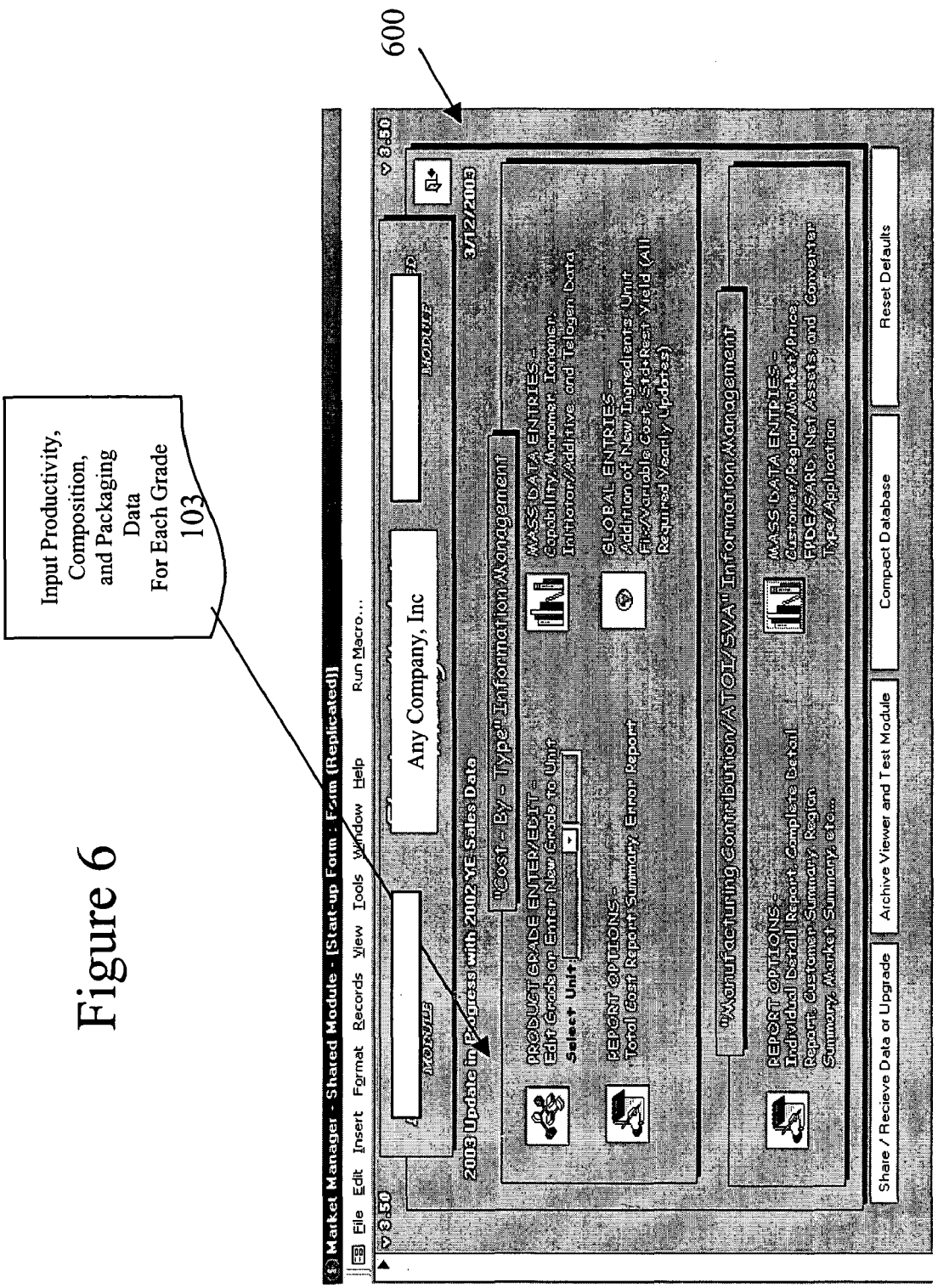
FIG. 6 shows an annotated version of the view of FIG. 3 where the icon for the "Cost by type" has been selected.
Figure 6A:
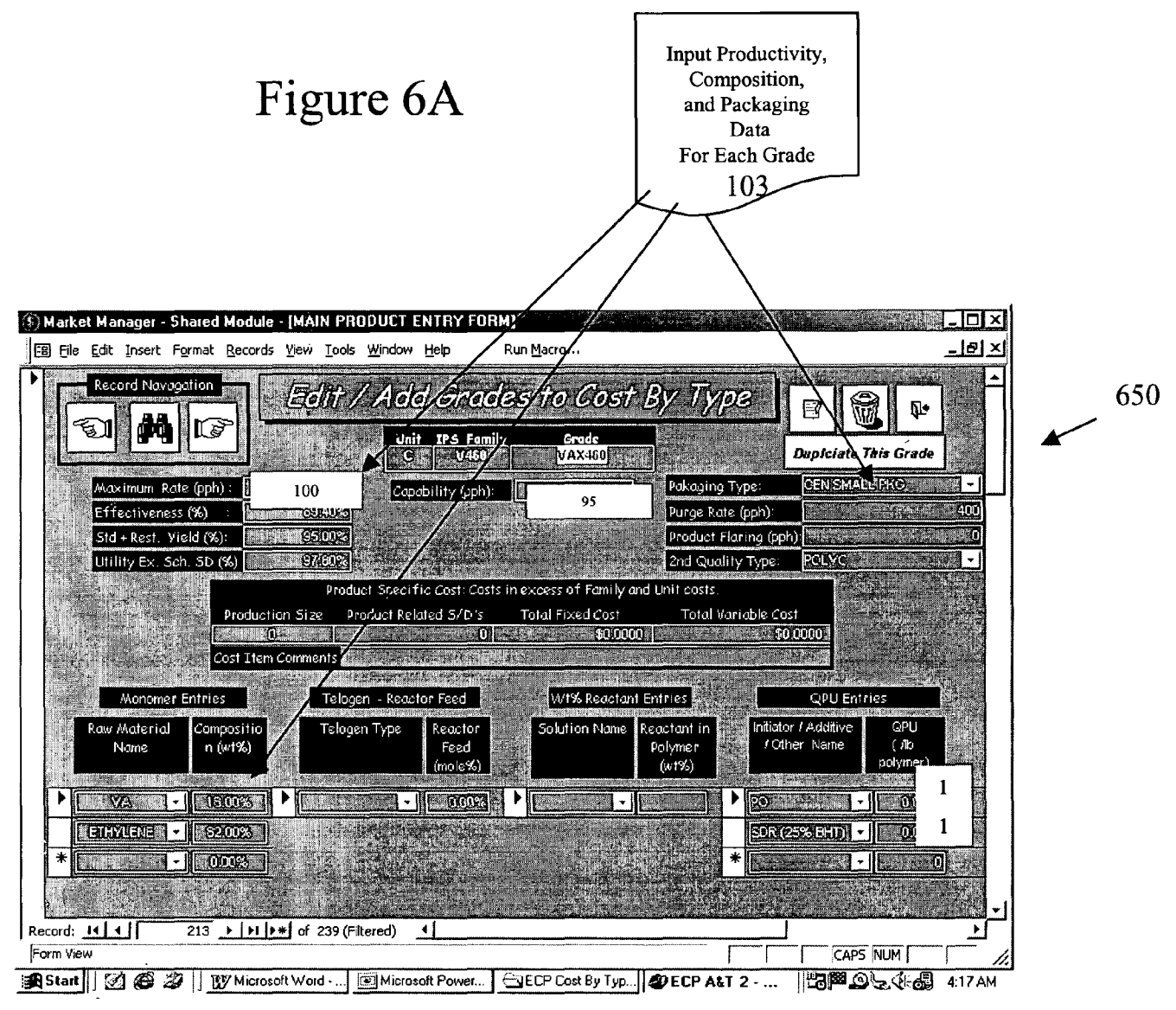

FIG. 6 shows a form 600, which is presented to the user when the "product grade enter/edit" icon 310 of FIG. 3 is selected. FIG. 6A shows a form 650 for inputting the form for selecting global databases when the icon "ingredients by unit" of FIG. 6 has been selected. Entries are made in a tabular format, identifying (from left to right): production unit, product family, unit production capability, etc.

FIG. 7 shows a form 700, which is presented to the user when the "mass data entry" 360 of FIG. 3 is selected. FIG. 7A shows a form 750 for inputting the form for selecting global databases when the icon "segment splits" icon of FIG. 7 has been selected. Entries are made in a tabular format, identifying (from left to right): production unit, product grade and volume.

In similar fashion, FIG. 8 shows a form 800 which is presented to the user for input of sales data by customer, region and grade (implementing box 111 of FIG. 2) and input of market segment by customer, region and grade (implementing box 112 of FIG. 2).

Figure 9:
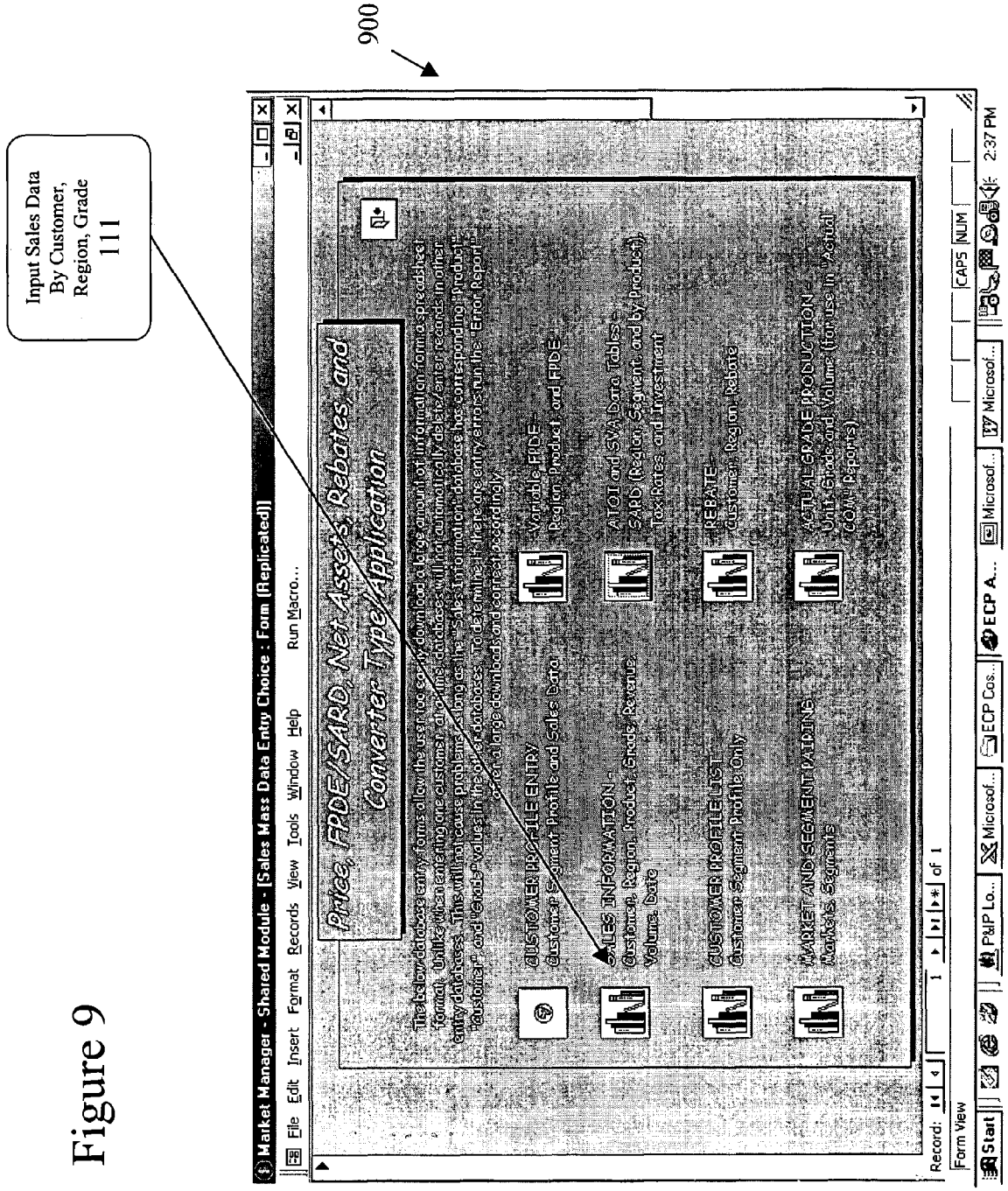
FIG. 9 shows a form for selecting input of sales data.
Figure 9A:
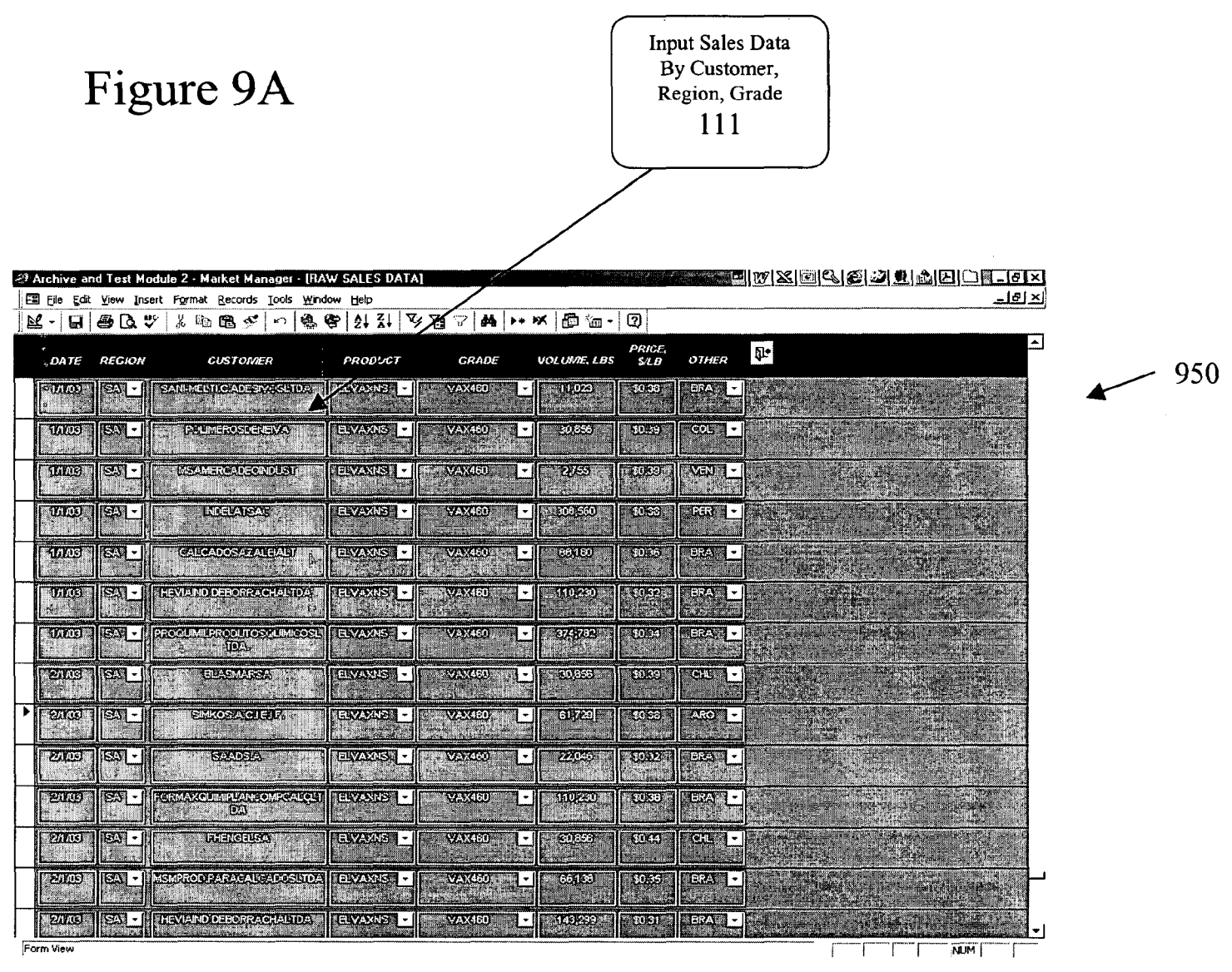
Figure 9B:
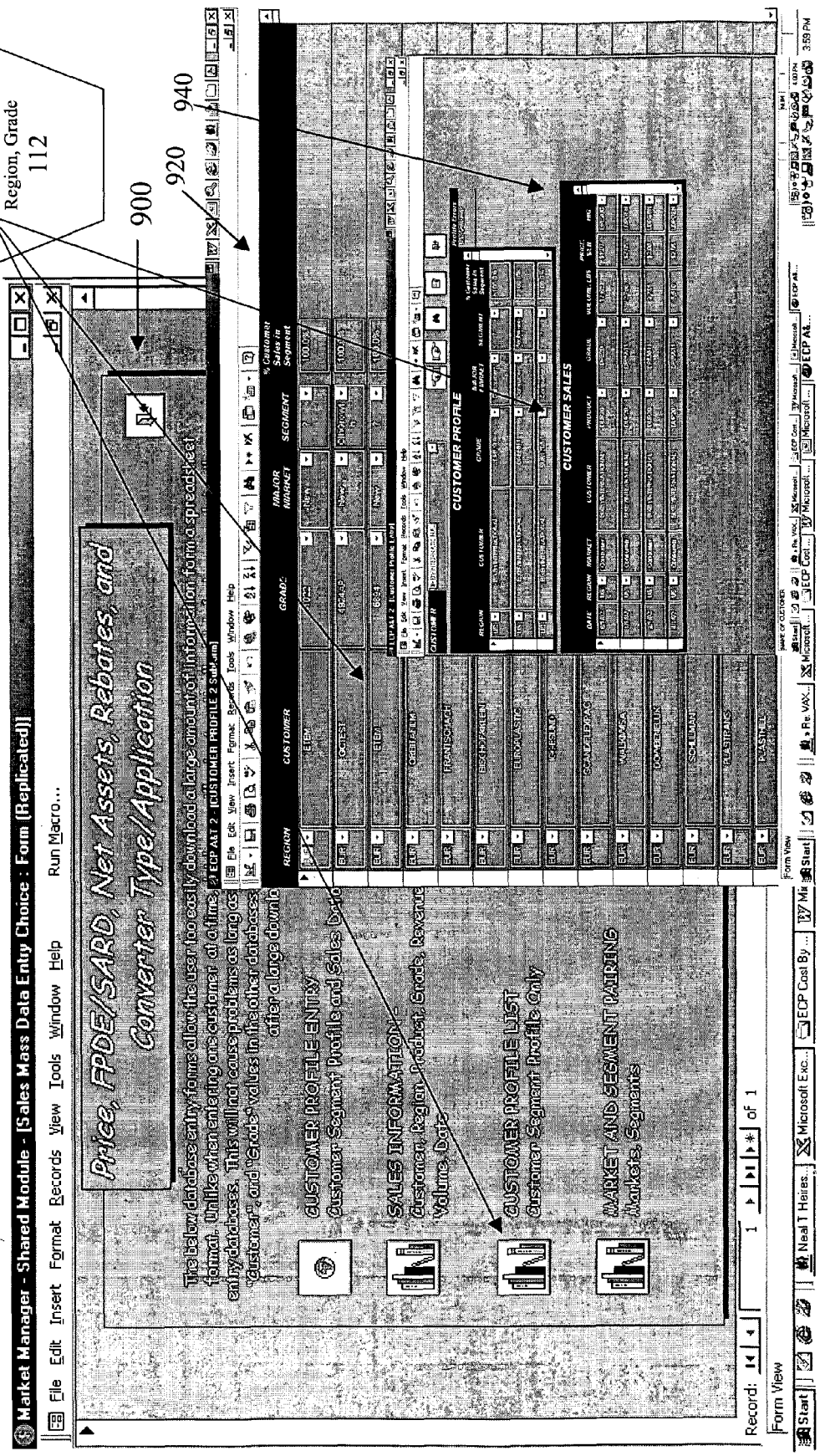
FIG. 9B shows a typical listing of entries of market and segment arranged by customer and product.

Similarly FIG. 9 shows a form 900 which is presented to the user when the user for input of sales data by customer, region and grade (implementing box 111 of FIG. 2). FIG. 9A shows form 950 for tabular entry of sales data.

FIG. 9B shows a form 900, an overlaid form 920 and a second overlaid form 940. Form 900 has "Customer Profile List", and "Customer Profile Entry" buttons that facilitate the present invention to assign the segment and market to a sale rather than entering this information from a spreadsheet on a periodic basis. Once the "customer profile entry" button has been selected, an alphabetical list will appear showing sales data that does NOT have a customer profile. This situation occurs when a sale is made to a new customer for the first time. This feature facilitates editing customer profiles since missing profiles are automatically identified.

In addition, the error report, which may be selected with the icon at the lower right of form 900 also will present customer profile errors to the user.

Figure 10:
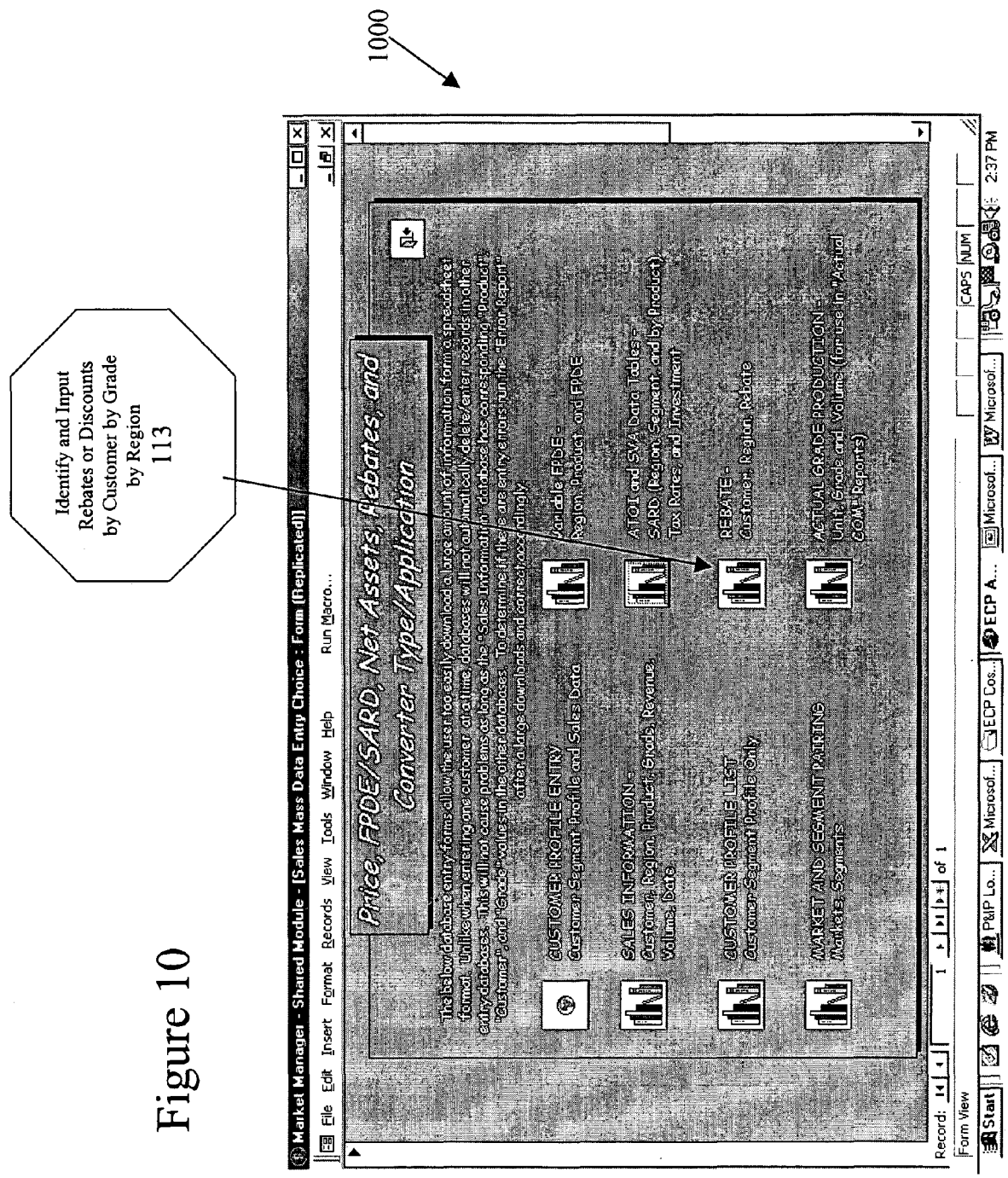
FIG. 10 shows a form for selecting entry of rebates or discounts.
Figure 10B:
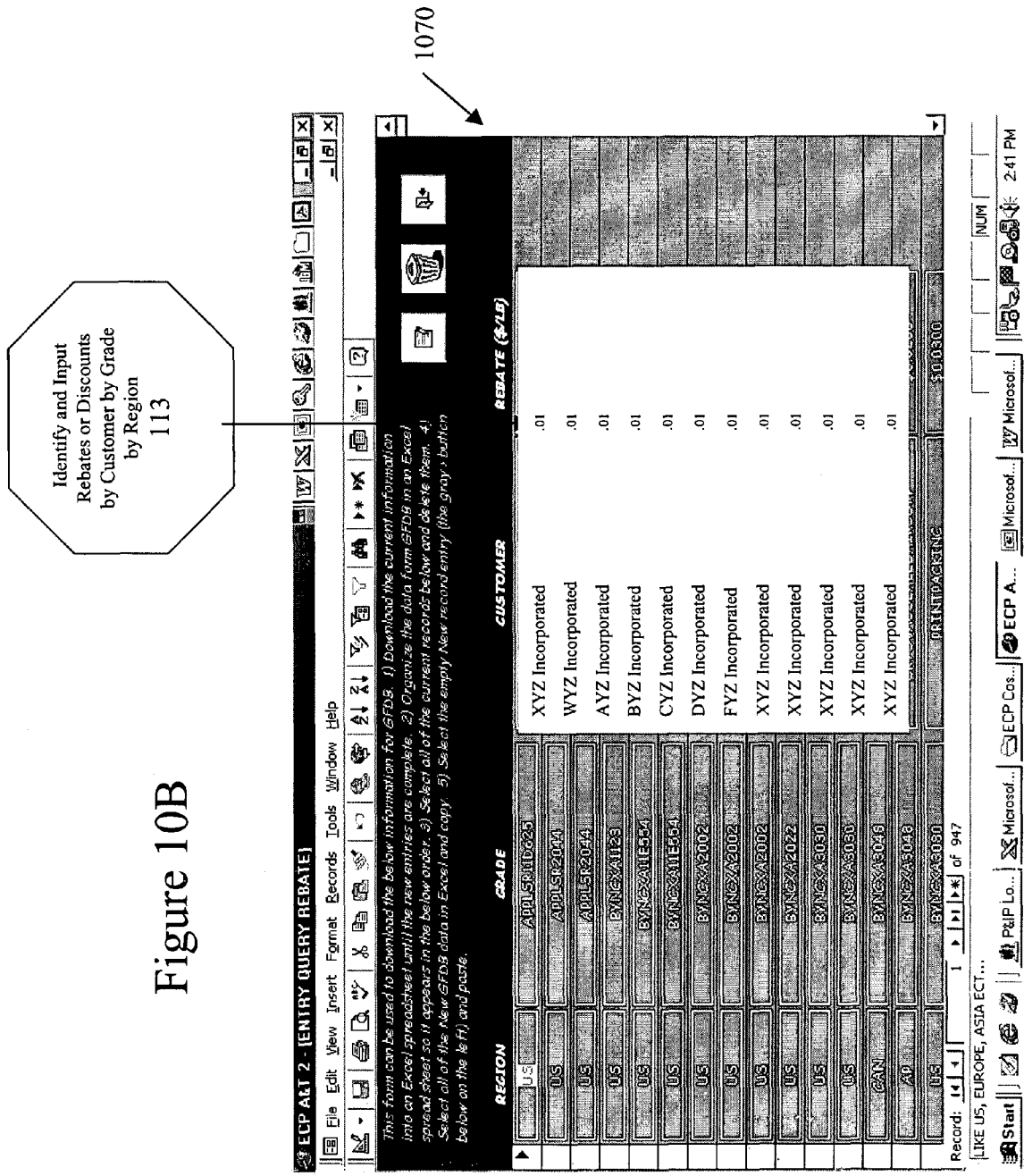
FIG. 10B shows a typical listing of entries of rebates or discounts by customer arranged by product grade.

FIG. 10 shows a form 1000 (essentially the same as form 700 of FIG. 7) which is presented to the user for selection of the "rebate" icon for entering rebates and discounts (implementing box 113 of FIG. 2). FIGS. 10A and 10B show two different data entry tables 1050 and 1070 respectively.

Figure 11:
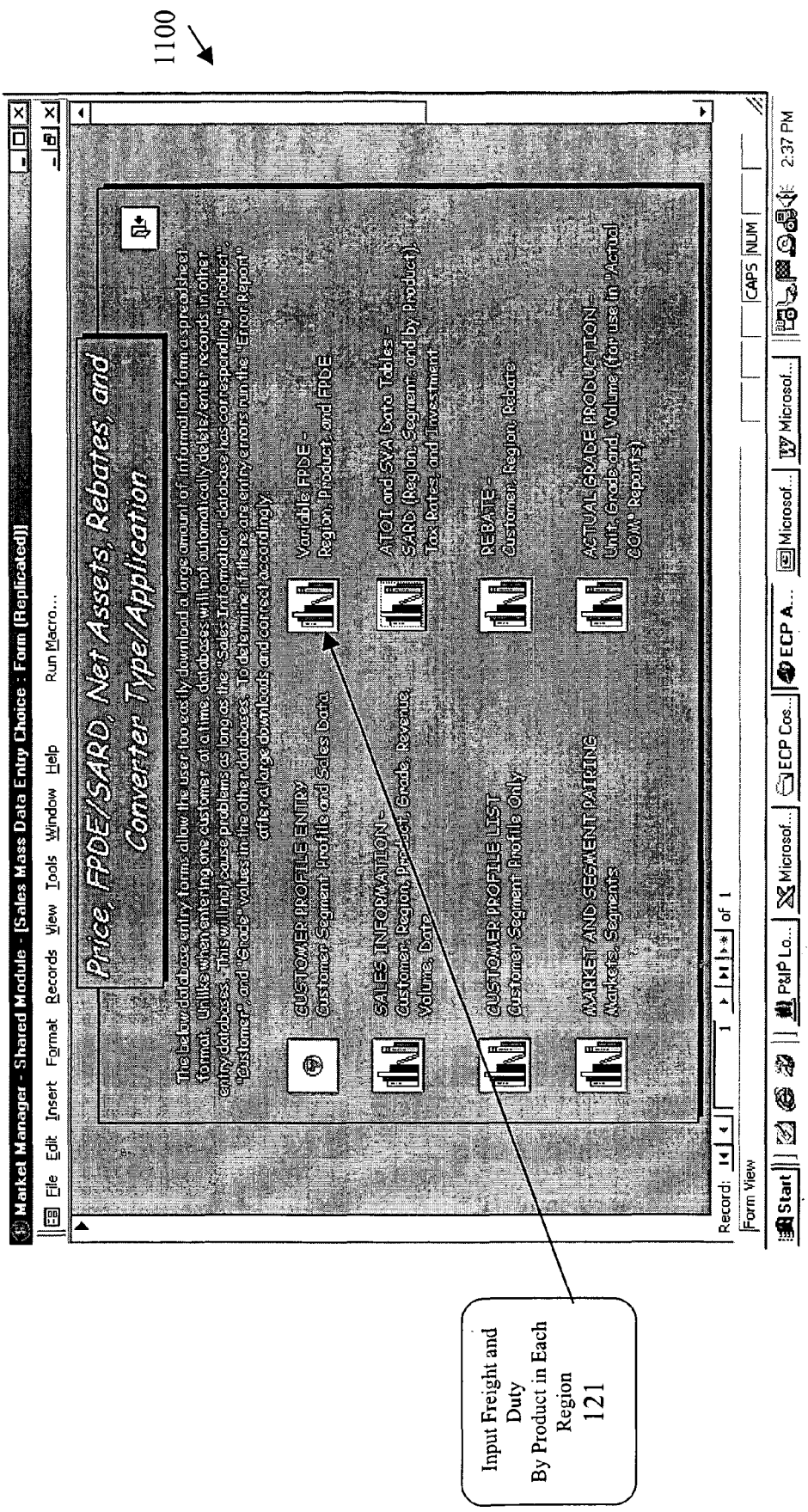
FIG. 11 shows a form for selecting input of freight and duty by product for each region.
Figure 11A:
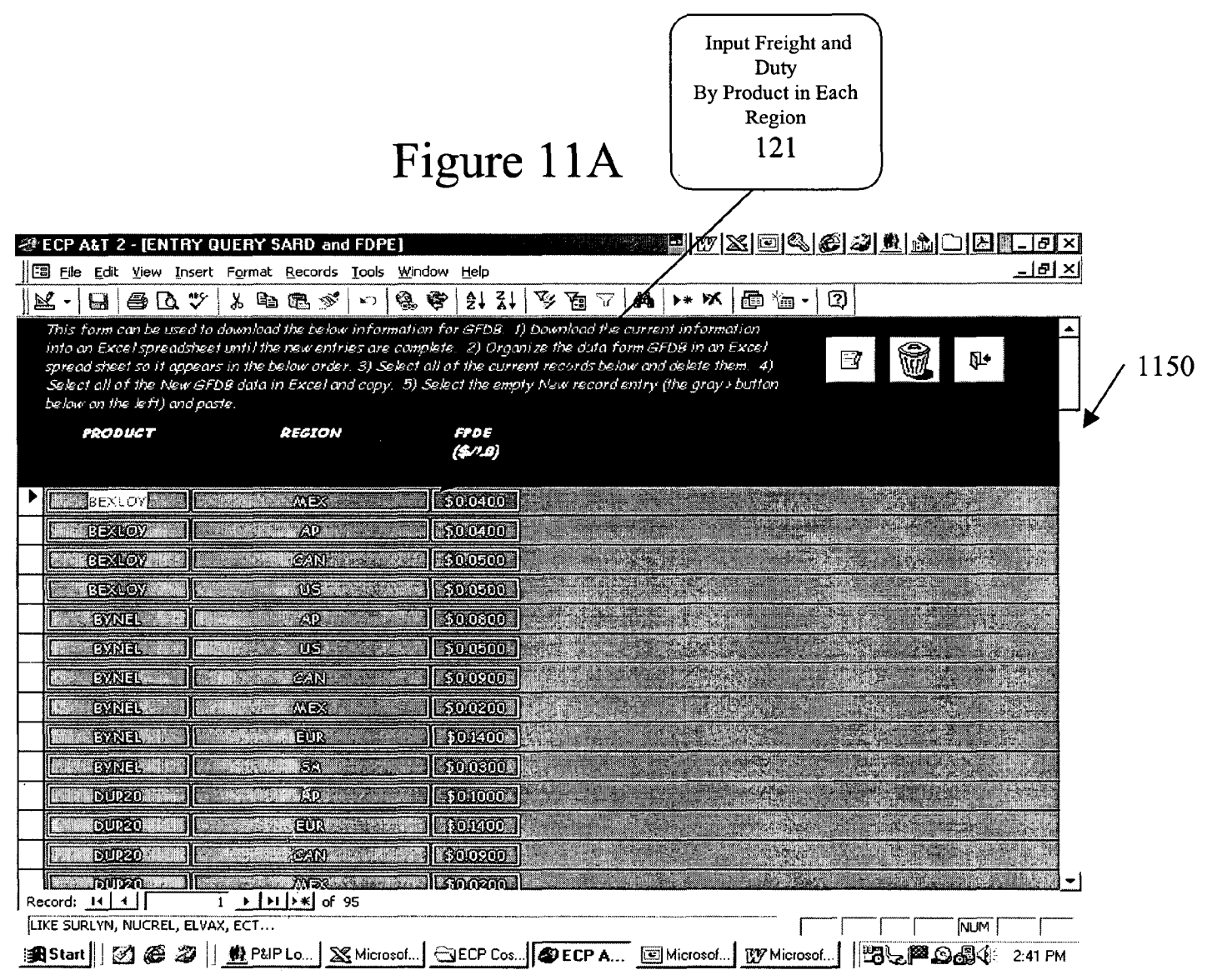

FIG. 11 shows a form 1100 (essentially the same as form 700 of FIG. 7) which is presented to the user for selection of the "variable FPDE" icon (implementing box 121 of FIG. 2). FIG. 11A shows a table 1150 for entering freight and duty.

Figure 12:
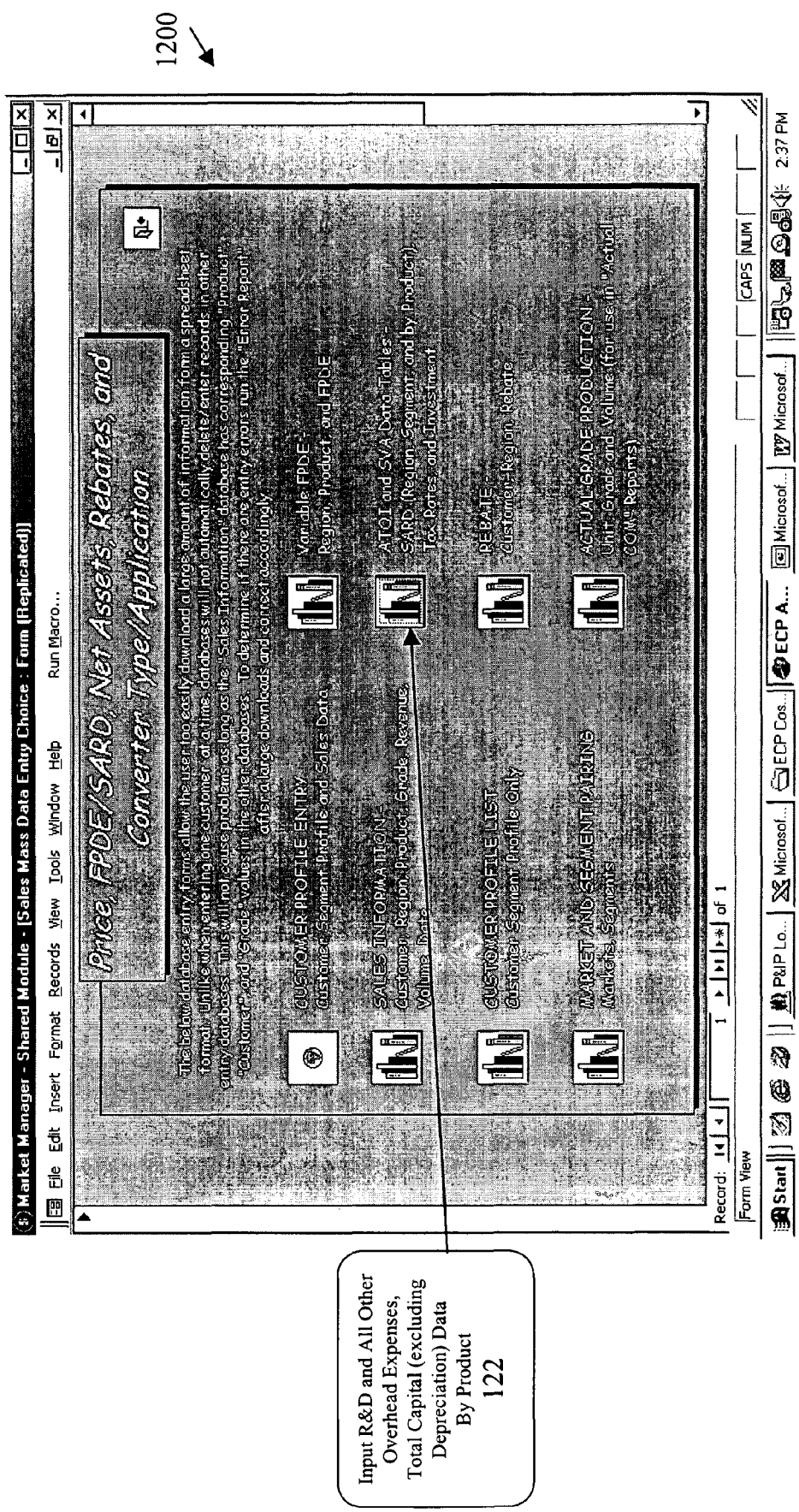
FIG. 12 shows a form for selecting input of R&D and other overhead expenses by product.

FIG. 12 shows a form 1200 (essentially the same as form 700 of FIG. 7) which is presented to the user for selection of the "ATOI and SVA Data Tables" icon (implementing box 122 of FIG. 2).

FIG. 13 shows a form 1300, which is presented to the user when the "ATOI and SVA Data Tables" icon of FIG. 12 is selected. When the "Product Entries" icon of FIG. 13 is selected form 1400 of FIG. 14 is presented to the user for entry of R&D expense and other overhead expenses, thus implementing box 122 of FIG. 2.

Figure 15:
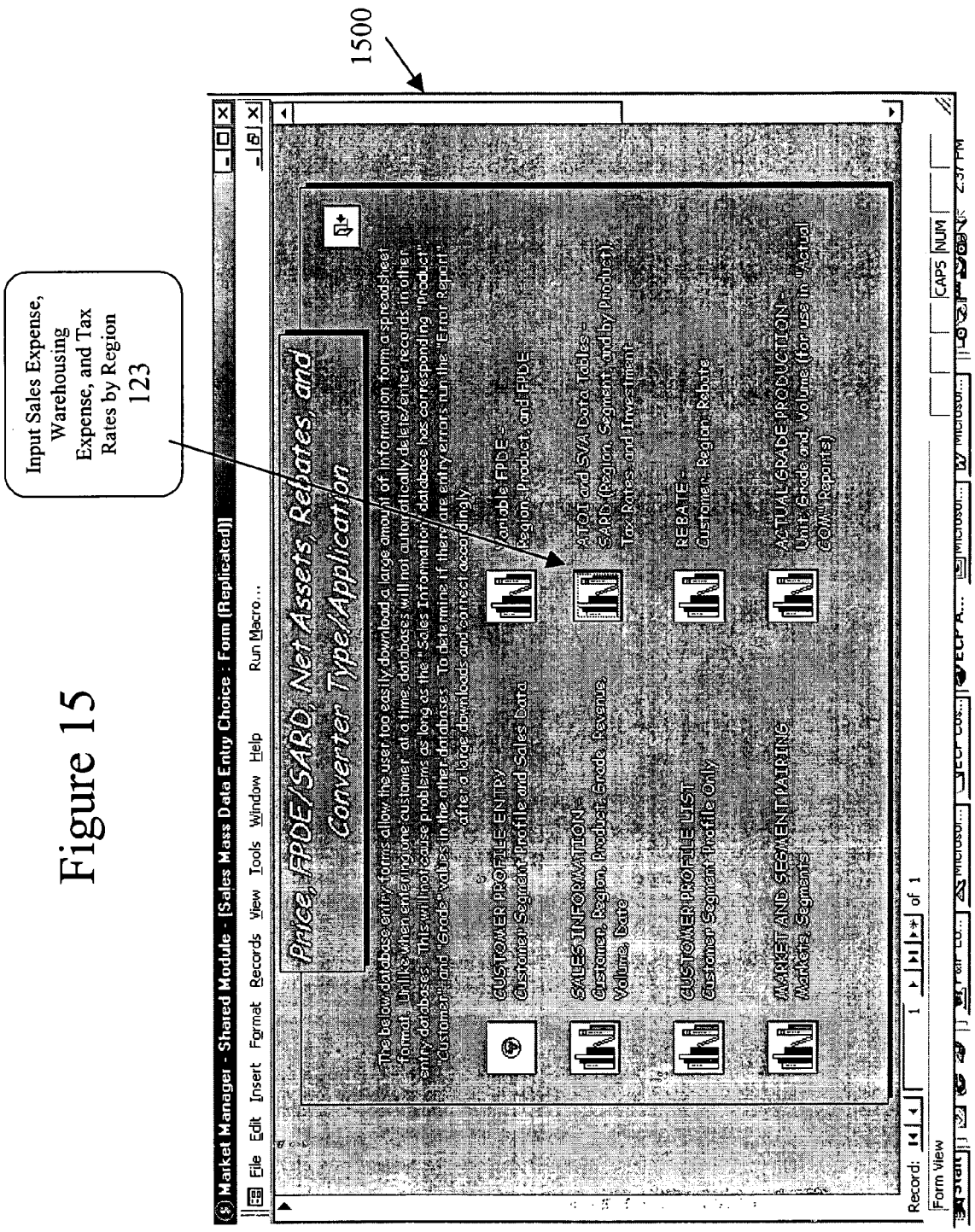
FIG. 15 shows a form for selecting input of sales expense, warehousing expense and tax rates.
Figure 16:
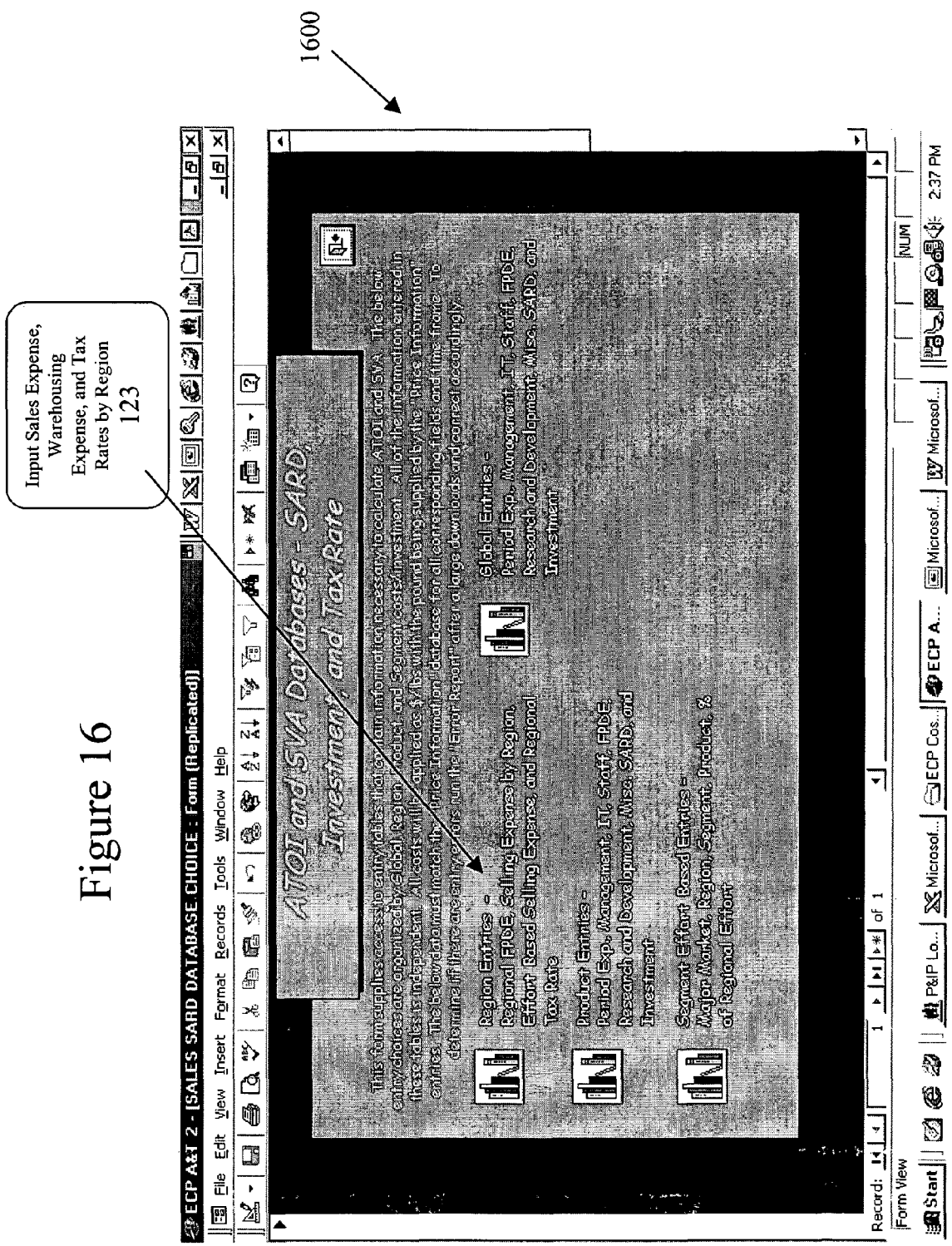
FIG. 16 shows a form for selecting input of sales expense, warehousing expense and tax rates.

FIG. 15 shows a form 1500 (essentially the same as form 700 of FIG. 7) which is presented to the user for selection of the "variable FPDE" icon (implementing box 123 of FIG. 2). When the "ATOI and SVA Data Tables" icon of FIG. 15 is selected, form 1600 of FIG. 16 is presented to the user. When the "regional entries" icon of form 1600 is selected, form 1650 of FIG. 16A is presented to the user for entry of data.

Figure 17:
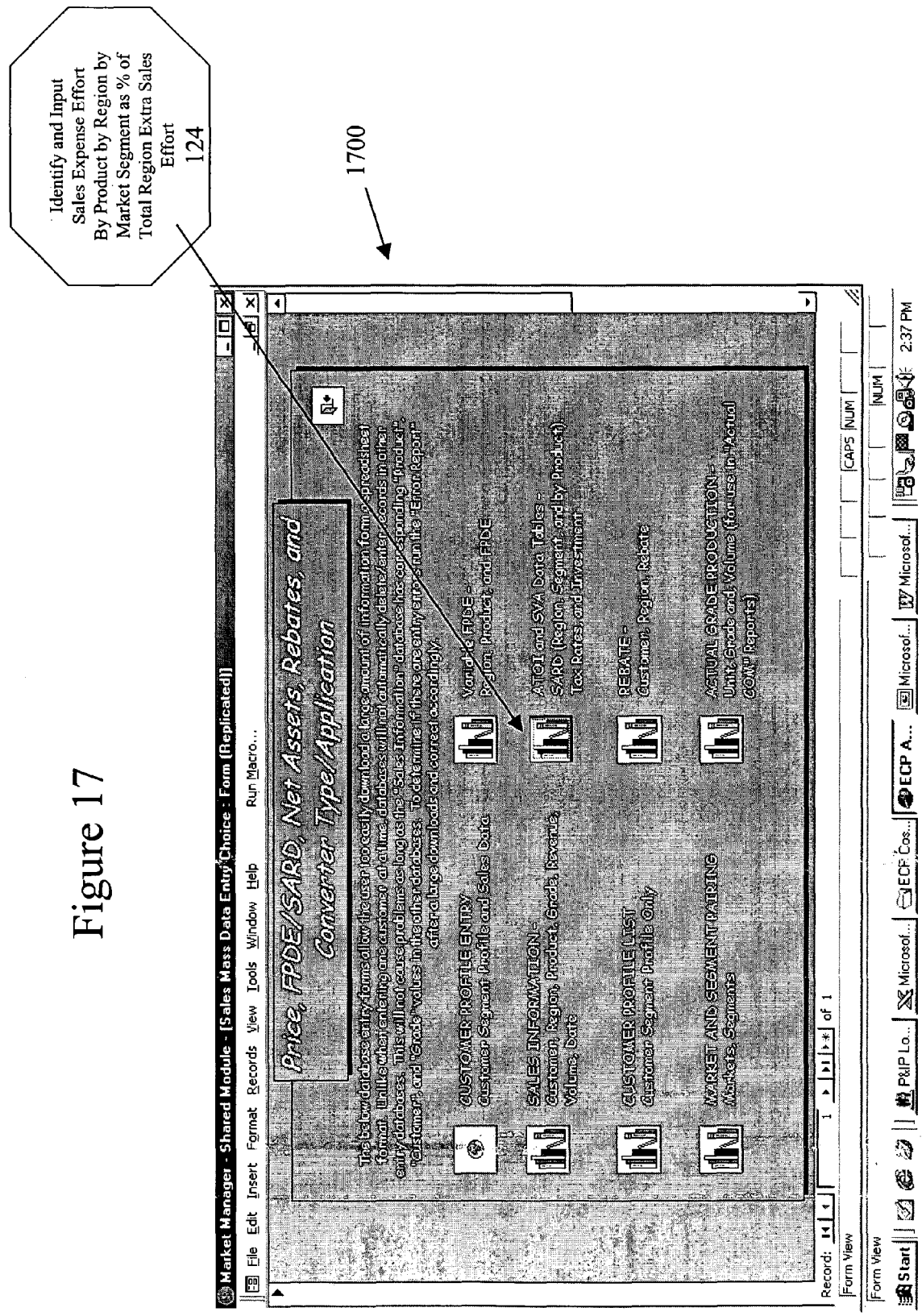
FIG. 17 shows a form for allocating regional sales effort per market segment.
Figure 17A:
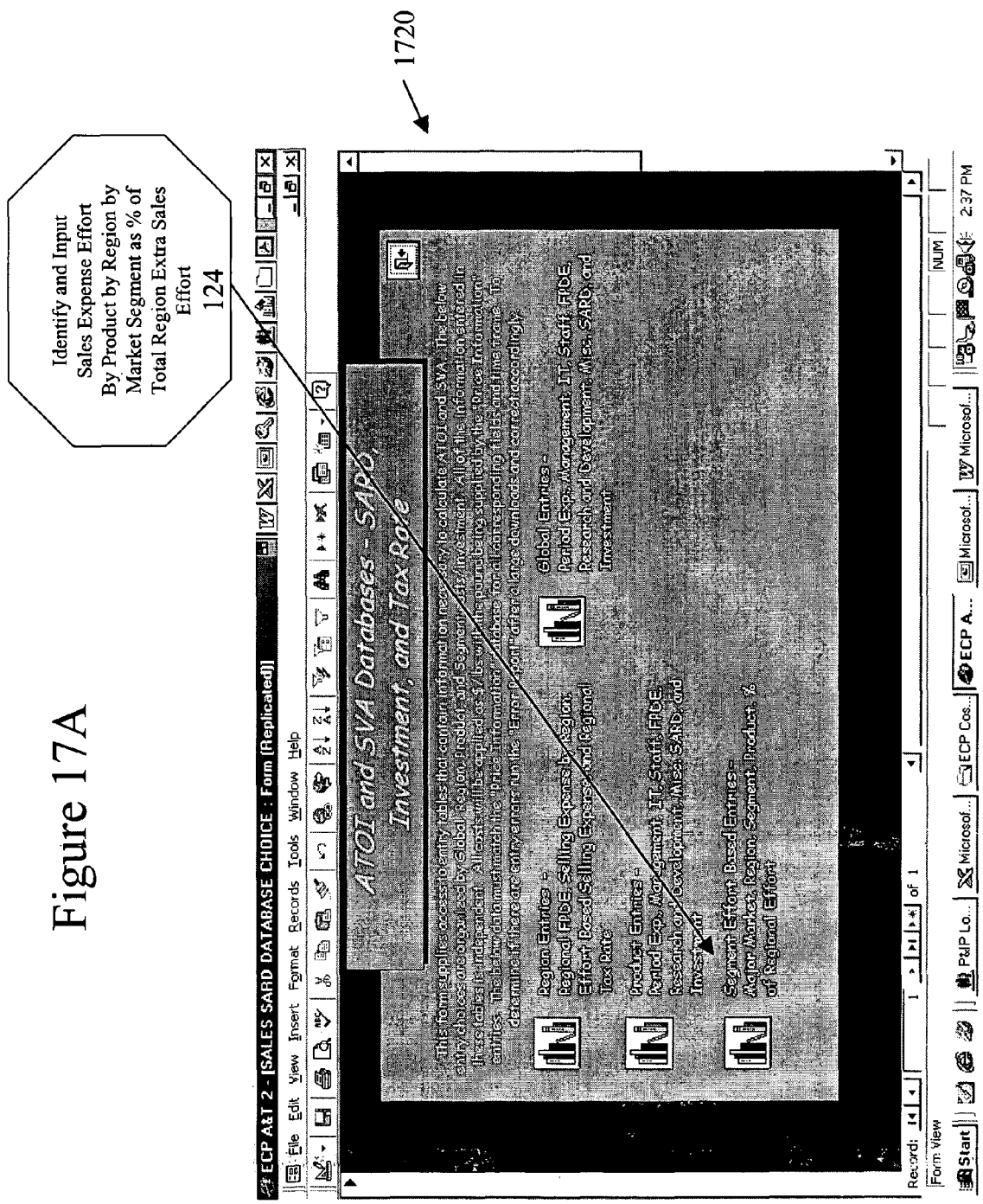
FIG. 17A shows a form for selecting the input of sales expense effort.
Figure 17B:
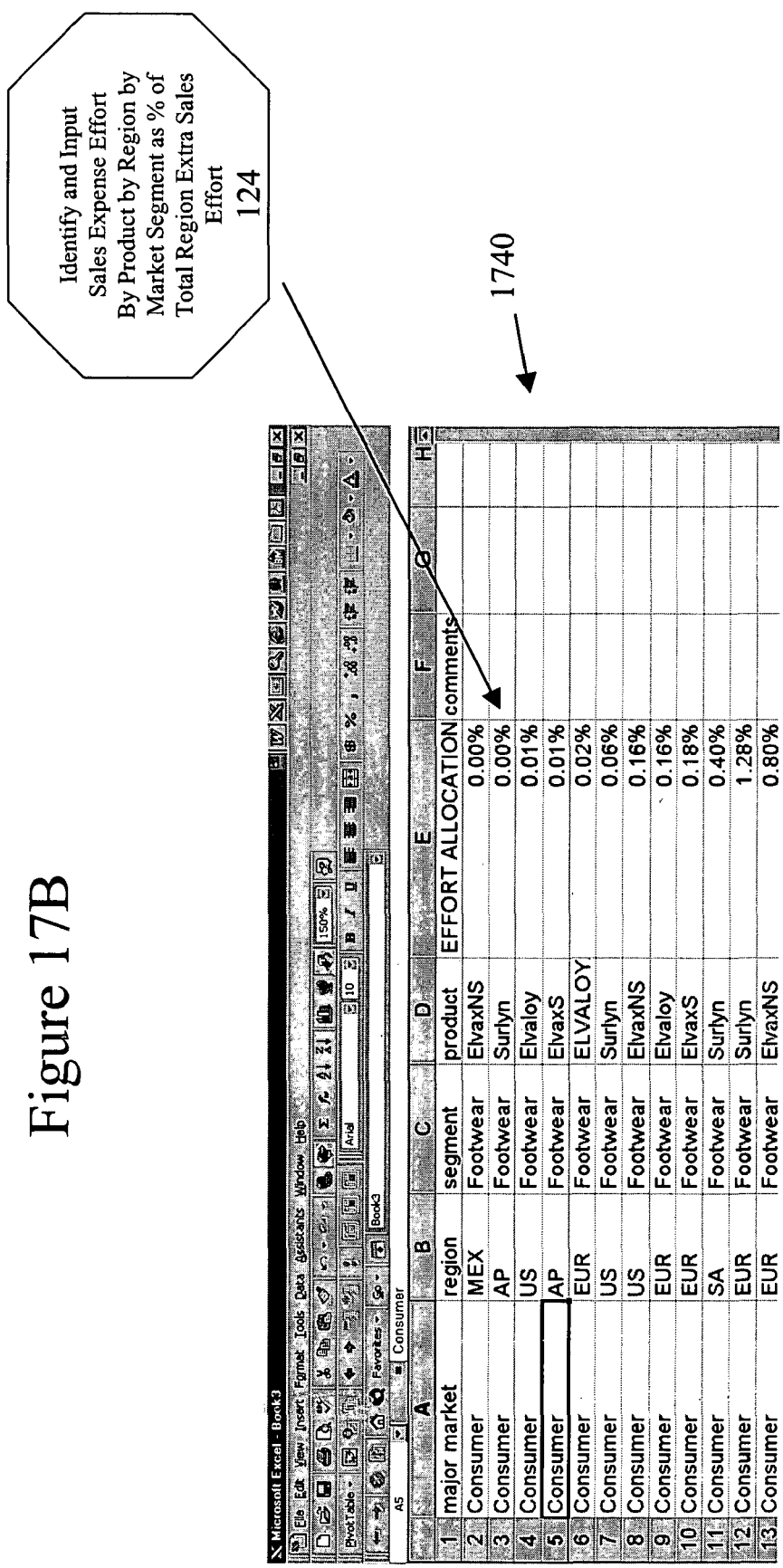
FIG. 17B shows a form for selecting the input of sales expense effort.
Figure 18:
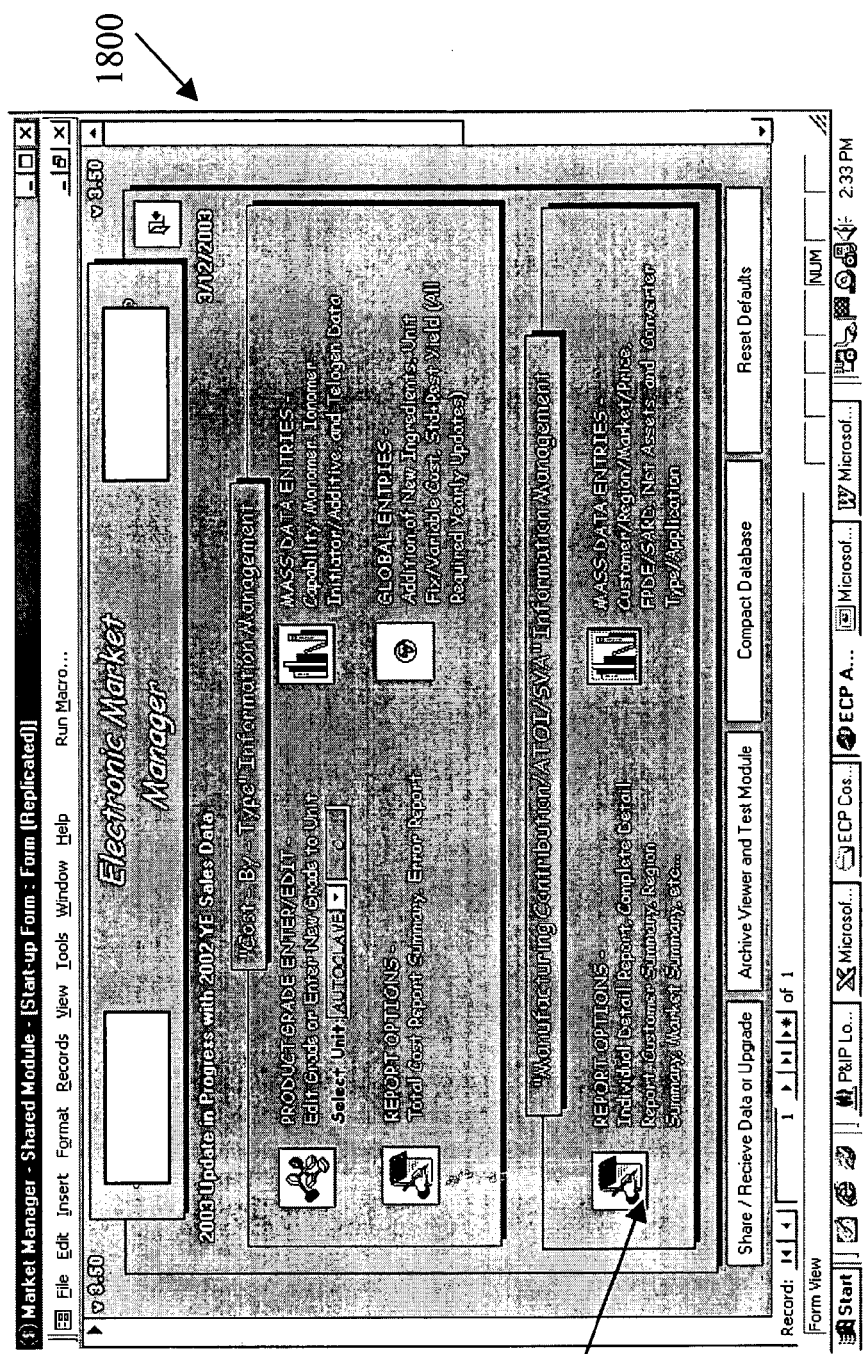
FIG. 18 shows a form for selecting the calculation of gross contribution, ATOI and EVA.

FIGS. 17, 17A, 17B and 17C implement box 124 of FIG. 2). FIG. 17 shows a form 1700 (essentially the same as form 700 of FIG. 7) which is presented to the user. When the user selects the "ATOI and SVA data tables" icon, form 1720 of FIG. 17A is presented. When the "segment splits" icon of form 1720 is selected, spreadsheet data of sales effort of FIG. 17B can be copied into Form 1760 of FIG. 17C which comprises the input of sales expense effort as a percentage of total region sales effort;

FIG. 18 shows a form 1800 (essentially the same as form 600 of FIG. 6) which is presented to the user for selection of the "report options" icon (implementing box 205 of FIG. 2). When the "report options" icon of FIG. 18 is selected, form 1900 of FIG. 19 is presented to the user for selection of report options.

Figure 23:
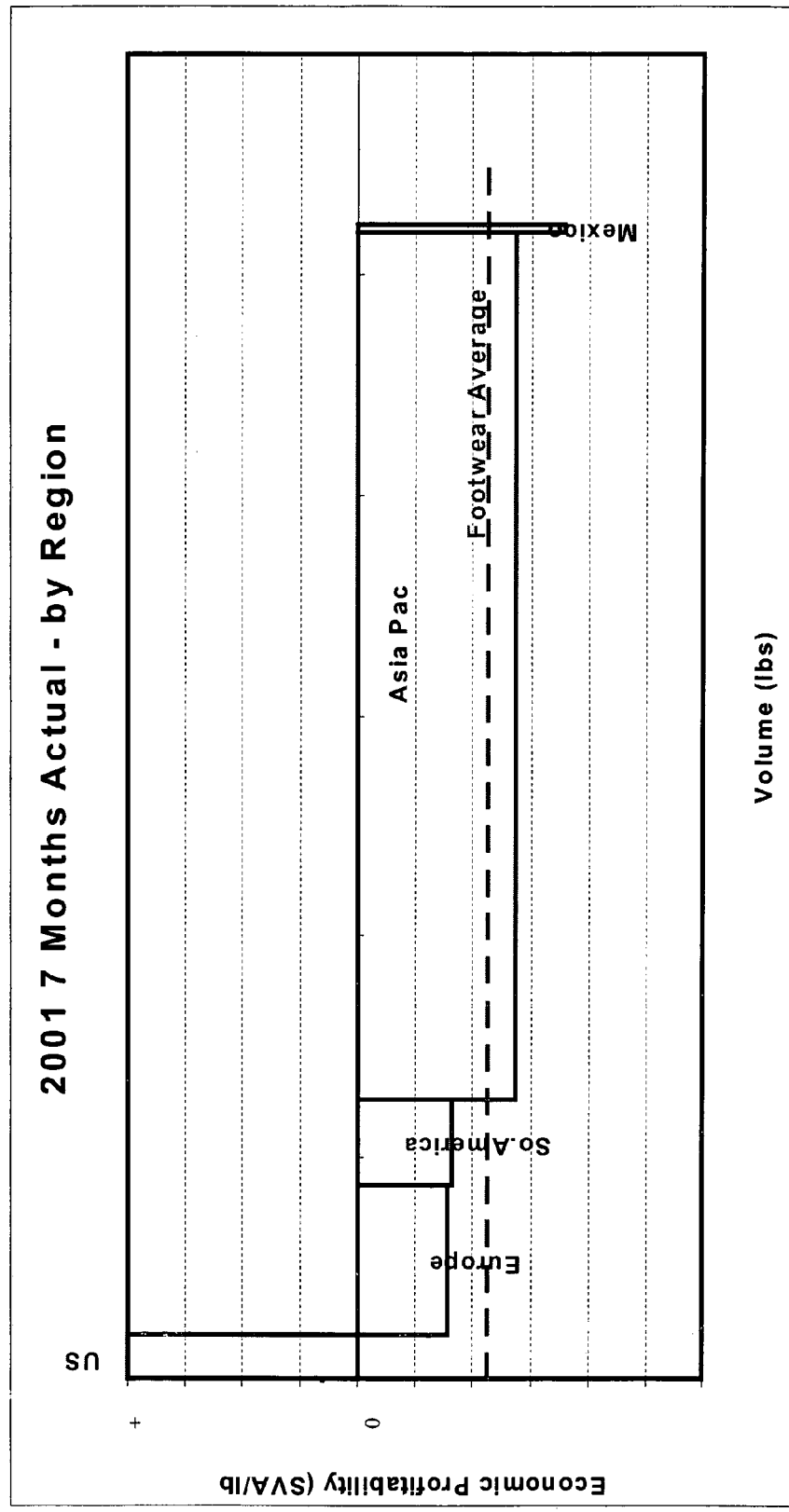
FIG. 23 shows an example of a waterfall chart.

FIGS. 20 through 23 are examples of outputs created by the present invention. FIGS. 20, 20A and 21 show tables to be loaded into pivot tables and charts for tabular and graphical presentation (implementing box 206 of FIG. 2). FIG. 22 is an example of a pivot table. FIG. 23 is an example of a well-known "waterfall table" produced from a pivot table.

Figure 24:
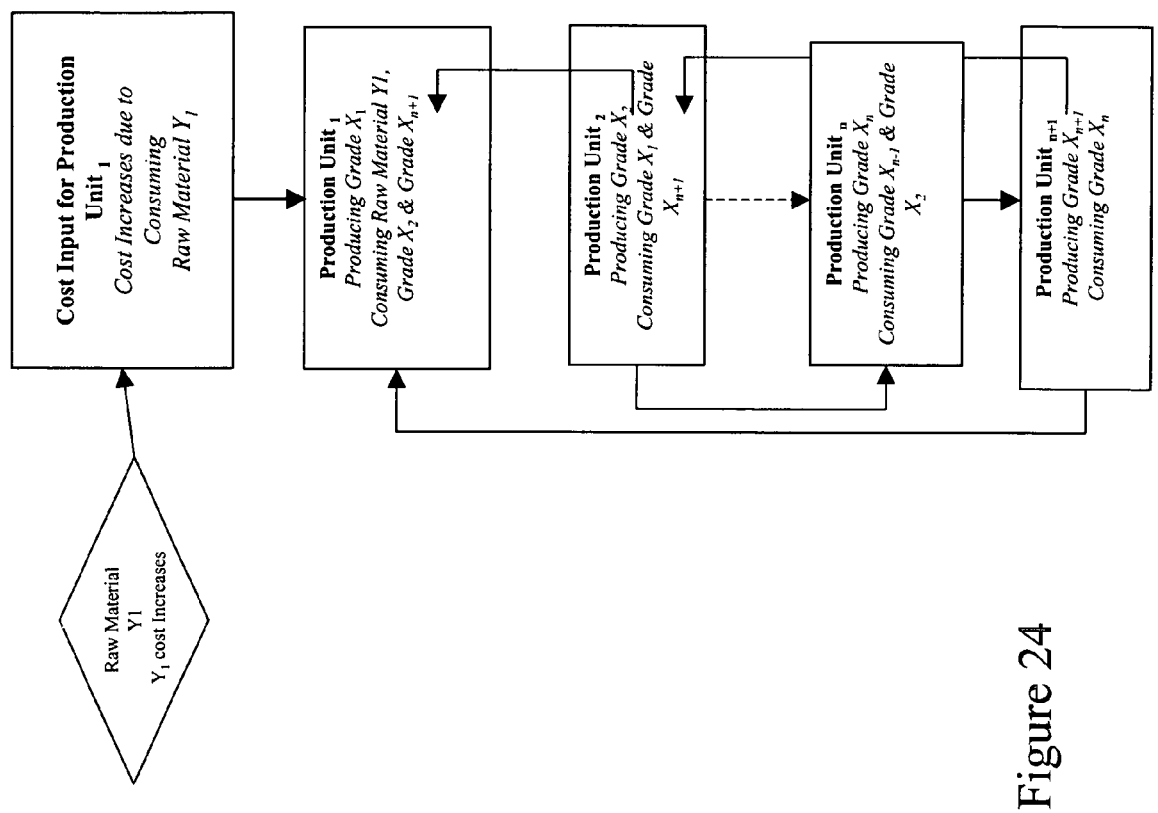
FIG. 24 shows an iterative process for reconciling the aggregate cost of manufacture of internally produced grades of product consumed in subsequent manufacturing steps with the raw materials list.

FIG. 24 shows a method of reconciling the cost of manufacture of an internally produced grade with the raw materials list. When a raw material ingredient cost changes, this change cascades to all production units that consume the ingredient directly and to the internally produced grades that consume the affected ingredient, whether directly or indirectly. Calculating an accurate aggregate cost of a product manufacture requires first reconciling the aggregate cost of manufacture of each internally produced grade with the raw materials list.

This reconciliation method is an iterative process. A predetermined threshold for the difference between the entered (or previously calculated) ingredient cost and the aggregate Cost of Manufacture is selected to determine when the iterative process should terminate. A maximum number of repetitions is also specified to stop the iterative process in case an erroneous value is entered or a calculation error occurs. Upon receiving a cost change that can affect the aggregate Cost of Manufacture, the Ingredients List for all Production Units is compared to the Cost of Manufacture for each product Grade to determine each affected ingredient. The aggregate Cost of Manufacture is a value based upon the production mix entered for each Production Unit.

Then for each affected ingredient that is used to manufacture a product grade, the difference between the existing (entered or previously calculated) ingredient costs and the aggregate Cost of Manufacture is calculated, the fixed cost and the variable cost being calculated independently. If the difference between the existing (entered or previously calculated) ingredient cost and the aggregate Cost of Manufacture exceeds the predetermined threshold, the ingredient cost is updated (i.e., replaced) with the aggregate cost of manufacture. Then a recalculation of all aggregate Cost of Manufacture values for all affected grades is initiated. This process is repeated until the difference between all existing (entered or previously calculated) ingredient costs and the aggregate Costs of Manufacture is less than or equal to the predetermined threshold or until a predetermined number of repetitions has been reached.

FIG. 24 shows a diagram of product flow in a typical manufacturing process comprised of Production Units 1, 2, . . . , n, and n+1. It should be noted that products produced in each Production Units can flow to a subsequent Production Unit as well as to one or more previous Production Units. Production Unit 1 produces grade $X_1$ by consuming raw material $Y_1$ as well as Grade $X_2$ and Grade $X_{n+1}$ (box A). If the cost of raw material $Y_1$ changes (e.g., increases) the cost of the grade $X_1$ increases. Production Unit 2 produces grade $X_2$ by consuming grade $X_1$, grade $X_3$, and grade $X_{n+1}$ (box B). Production Unit n produces grade $X_n$ by consuming grade $X_2$ and grade $X_{n-1}$ (box C). Production Unit n+1 produces grade $X_{n+1}$ by consuming grade $X_n$ (box D).

As may be appreciated by one skilled in the art, accurate calculation of cost of manufacture of each product grade in such a manufacturing process is difficult. The iterative cost reconciliation process described above, however, is capable of calculating the aggregate cost of manufacture of each grade of product, even in such a complex manufacturing process.

A system for computing an economic value created by a particular business activity may be implemented in accordance with the method of the present invention. The system may comprise a single computer or may be implemented in a network, the system comprising: a server node having a memory therein, and at least one user node. The memory of the server node may have a user-interface section, a custodian-accessible section, a data interface section, and a repository section.

The user-interface section may have at least one predetermined user-accessible form for entering data and at least one predetermined graphical format for viewing data and results.

The custodian-accessible section may have privileged access to the user-interface section, to the data interface section and to the repository section.

The repository section may have at least one relational database containing predefined records that have been entered by a user or received by the data interface and predetermined equations for operation upon the records to produce results.

At least one user is connectible to the memory of the server, the user node being operable in either an input mode or an output mode.

When operable in the input mode, the user node is connectible to the repository section for entry of data or for editing of records previously entered by that user. When operable in the output mode, the user node is connectible to the repository section for retrieval of data and results, the user node displaying data and results in accordance with the at least one predetermined graphical format.

Having benefit of the above description, the skilled practitioner will appreciate that other relational databases may be used and will recognize that other input formats may be used as appropriate. The skilled practitioner will also appreciate that other known graphical techniques for visualization of output data may be used.

What is claimed is:

1. A computer-readable storage medium having a set of instructions stored therein, which when executed by the computer causes the computer to perform a method for calculating an economic value created by a manufacturing process for manufacturing products produced in a plurality of production units $1, 2, \ldots, m, \ldots, n-1$, and n, the production units respectively consuming ingredient materials $Y_1, Y_2, \ldots, Y_m, \ldots, Y_{n-1}, Y_n$, and respectively producing products $X_1, X_2, \ldots, X_m \ldots, X_{n-1}, X_n$, wherein a product $X_m$ produced in a production unit m can flow as an ingredient material $Y_{m+1}$ to a subsequent production unit m+1, or can flow as an ingredient material $Y_1, Y_2, Y_{m-1}$ to one or more previous production units $1, 2, \ldots, m-1$, said method comprising the steps of:

a) calculating an aggregate cost of manufacture of each product by:
  i) collecting cost data from diverse sources into a relational database, the cost data collected by the steps of:
    1) collecting utility and ingredient materials cost for each product;
    2) assembling cost data for each production unit;
    3) assembling productivity, composition and packaging data for each product;
    4) collecting manufacturing volume by product for each production unit;
    5) establishing a production mix and an ingredients list for each production unit by apportioning the product $X_m$ produced by each production unit m as ingredient materials Y to each of the other previous production units $1, 2, \ldots, m-1$ and a subsequent production unit m+1;

b) establishing a predetermined threshold for the difference between a previous cost of an ingredient material Y and the aggregate cost of manufacture of a product X that is used as an ingredient material Y;

c) if a cost change occurs that affects the aggregate cost of manufacture of the product X, then comparing the cost of ingredient materials Y of the ingredients list for all production units to the aggregate cost of manufacture of each product X that is used as an ingredient material Y to determine each affected ingredient material Y;

d) using the production mix for each production unit m, recalculating the aggregate cost of manufacture of each product $X_m$;

e) for each affected ingredient material Y that is used by a production unit to manufacture a product X, calculating a difference between the previous cost of the ingredient material Y and the aggregate cost of manufacture of the product X that is used as an ingredient material Y, the fixed cost and the variable cost being calculated independently of each other;

f) if the difference between the previous cost of the ingredient material Y and the recalculated aggregate cost of manufacture of the product X exceeds the predetermined threshold, then replacing the previous ingredient cost with the recalculated aggregate cost of manufacture of the product X;

g) recalculating aggregate costs of manufacture for all affected products;

h) if the difference between the previous cost of the ingredient material Y and the recalculated aggregate cost of manufacture of the product X exceeds the predetermined threshold, then repeating steps f) and g) until the difference is less than or equal to the predetermined threshold;

i) selecting at least one parameter, the at least one parameter comprising a customer, a sales region, a product grade or a market segment;

j) calculating a sales volume and a net price related to the at least one parameter;

k) using results of steps g) and j), calculating a manufacturing contribution related to the at least one parameter;

l) using results of step k), calculating an after tax operating income related to the at least one parameter; and m) using the results of steps a) through l), calculating an economic value for the at least one parameter, thereby determining the economic value created by the manufacturing process.

2. The computer-readable storage medium of claim 1 wherein the collection step a) i) is accomplished by loading the data into predetermined fields in a relational database system.

3. The computer-readable storage medium of claim 2 wherein the collection step a) i) further comprises, before the loading step, the step of accumulating data in one or more spreadsheets.

4. The computer-readable storage medium of claim 1 further comprising, after each collection step, the step of generating a discrepancy report by determining if data required for a subsequent calculation is missing and analyzing the data against predetermined criteria for discrepancies or possible out of normal range values.

5. The computer-readable storage medium of claim 1 wherein the calculation steps a), d), g), j), k), l), and m) are performed by:
  1) accessing the data in the predetermined fields of the relational database system;
  2) applying predetermined equations to the data; and
  3) storing the results in predetermined results fields in the relational database system.

6. The computer-readable storage medium of claim 5 further comprising, before each calculation step, the step of generating a discrepancy report by determining if data required for a subsequent calculation is missing and analyzing the data against predetermined criteria for discrepancies or possible out of normal range values.

7. The computer-readable storage medium of claim 5 further comprising displaying the results in a graphical format, the graphical format being user selectable from a plurality of graphical formats by:
  4) defining each graphical format to have predetermined input parameters;

5) accessing the predetermined results fields of the relational database that correspond to the input parameters.

8. The computer-readable storage medium of claim 7 wherein the predetermined results fields are loaded into a spreadsheet and then into a pivot table to display the results.

9. The computer-readable storage medium of claim 7 wherein the graphical format is a numeric table, comprising a pivot table.

10. The computer-readable storage medium of claim 7 wherein the graphical format is a waterfall chart.

11. The computer-readable storage medium of claim 7 wherein the graphical format is a bar chart.

12. The computer-readable storage medium of claim 7 wherein the graphical format is a line graph.

13. The computer-readable storage medium of claim 1 wherein costs across families of products are distributed based upon shared use of manufacturing assets.

14. The computer-readable storage medium of claim 13 wherein the shared use of assets is determined by the fraction of time a product family occupies each asset.

15. The computer-readable storage medium of claim 13 wherein the shared use of assets is determined by the volume fraction of a product family flowing through each asset.

16. The computer-readable storage medium of claim 13 wherein unexpected costs are allocated over all the products manufactured according to predetermined criteria.

17. The computer-readable storage medium of claim 1 further comprising, before each calculation step, a step of generating a discrepancy report by determining if data required for each calculation is missing and analyzing the data against predetermined criteria for discrepancies or possible out of normal range values.

18. The computer-readable storage medium of claim 17 further comprising a step of terminating the calculation if the discrepancy report indicates missing data or data containing discrepancies.

19. The computer-readable storage medium of claim 1 wherein the step a) of calculating the aggregate cost of manufacture of a product further comprises the step of:
   ii) reconciling the aggregate cost of manufacture of an internally produced product with a raw materials list.

20. The computer-readable storage medium of claim 19 wherein the reconciling step comprises the steps of:

1) if a cost change is received that affects the aggregate cost of manufacture, then comparing the ingredients list for all production units to the aggregate cost of manufacture of each product to determine each affected ingredient, where the aggregate cost of manufacture is based upon the production mix entered;
2) for each affected ingredient that is used to manufacture a product calculating the difference between a previous ingredient cost and the aggregate cost of manufacture, where the fixed cost and the variable cost are is calculated independently of each other;
3) if the difference between the previous ingredient cost and the aggregate cost of manufacture exceeds a predetermined threshold, then updating the ingredient cost with the aggregate cost of manufacture;
4) recalculating all cost of manufacture values for all affected products;
5) repeating steps 1) through 4) until the difference between the previous ingredient cost and the aggregate cost of manufacture is less than or equal to the predetermined threshold or until a predetermined number of repetitions has been reached.

21. The computer-readable storage medium of claim 1 wherein the computer utilizes a plurality of electronic spreadsheets and a relational database, the spreadsheets being used for the collection of data and the display of results, the relational database being used to receive the data from the spreadsheets, to calculate results in accordance with predetermined equations and to store the results in predefined data structures.

22. The computer-readable storage medium of claim 1 further comprising, after step b):
   b1) establishing a maximum number of repetitions to stop the iterative process in case an erroneous value is entered or a calculation error occurs; and
further comprising, after step g):
   g1) stopping the repetition of steps f) and g) if the maximum number of repetitions is reached before the difference between all previous ingredient costs and the aggregate costs of manufacture is less than or equal to the predetermined threshold.

* * * * *